United States Patent
Marrero et al.

(10) Patent No.: US 12,141,986 B2
(45) Date of Patent: *Nov. 12, 2024

(54) SHAPE FUSION FOR IMAGE ANALYSIS

(71) Applicant: Nvidia Corporation, Santa Clara, CA (US)

(72) Inventors: David Jesus Acuna Marrero, Toronto (CA); Towaki Takikawa, Waterloo (CA); Varun Jampani, Nashua, NH (US); Sanja Fidler, Toronto (CA)

(73) Assignee: Nvidia Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/333,166

(22) Filed: Jun. 12, 2023

(65) Prior Publication Data
US 2023/0342941 A1 Oct. 26, 2023

Related U.S. Application Data

(63) Continuation of application No. 16/825,192, filed on Mar. 20, 2020, now Pat. No. 11,676,284.
(Continued)

(51) Int. Cl.
*G06T 7/12* (2017.01)
*G06F 18/25* (2023.01)
(Continued)

(52) U.S. Cl.
CPC .............. *G06T 7/12* (2017.01); *G06F 18/253* (2023.01); *G06V 10/255* (2022.01);
(Continued)

(58) Field of Classification Search
CPC ............. G06T 7/12; G06T 2207/20081; G06T 2207/20084; G06T 2207/30252;
(Continued)

(56) References Cited

U.S. PATENT DOCUMENTS 10,872,275 B2 12/2020 Wang
10,922,589 B2 2/2021 Sargent
(Continued)

FOREIGN PATENT DOCUMENTS

| CN | 107169974 A | 9/2017 |
| CN | 109190626 A | 1/2019 |
| CN | 109461157 A | 3/2019 |

OTHER PUBLICATIONS

Huang, Qin, et al. "Object boundary guided semantic segmentation." Computer Vision-ACCV 2016: 13th Asian Conference on Computer Vision, Taipei, Taiwan, Nov. 20-24, 2016, Revised Selected Papers, Part I 13. Springer International Publishing, 2017. (Year: 2016).*

(Continued)

*Primary Examiner* — Jonathan S Lee
(74) *Attorney, Agent, or Firm* — Hogan Lovells US LLP

(57) ABSTRACT

Various types of image analysis benefit from a multi-stream architecture that allows the analysis to consider shape data. A shape stream can process image data in parallel with a primary stream, where data from layers of a network in the primary stream is provided as input to a network of the shape stream. The shape data can be fused with the primary analysis data to produce more accurate output, such as to produce accurate boundary information when the shape data is used with semantic segmentation data produced by the primary stream. A gate structure can be used to connect the intermediate layers of the primary and shape streams, using higher level activations to gate lower level activations in the shape stream. Such a gate structure can help focus the shape stream on the relevant information and reduces any additional weight of the shape stream.

20 Claims, 20 Drawing Sheets

Related U.S. Application Data

(60) Provisional application No. 62/872,650, filed on Jul. 10, 2019, provisional application No. 62/822,685, filed on Mar. 22, 2019.

(51) Int. Cl.
  *G06V 10/20* (2022.01)
  *G06V 10/44* (2022.01)
  *G06V 10/764* (2022.01)
  *G06V 10/80* (2022.01)
  *G06V 10/82* (2022.01)
  *G06V 20/56* (2022.01)

(52) U.S. Cl.
  CPC .......... *G06V 10/454* (2022.01); *G06V 10/764* (2022.01); *G06V 10/806* (2022.01); *G06V 10/82* (2022.01); *G06V 20/56* (2022.01); *G06T 2207/20081* (2013.01); *G06T 2207/20084* (2013.01); *G06T 2207/30252* (2013.01)

(58) Field of Classification Search
  CPC .. G06F 18/253; G06V 10/255; G06V 10/454; G06V 10/764; G06V 10/806; G06V 10/82; G06V 20/56
  USPC ........................................................ 382/103
  See application file for complete search history.

(56) References Cited

U.S. PATENT DOCUMENTS

| | | | |
|---|---|---|---|
| 11,069,150 | B2 | 7/2021 | Sminchisescu |
| 2019/0043203 | A1 | 2/2019 | Fleishman et al. |
| 2019/0065867 | A1 | 2/2019 | Huang et al. |
| 2019/0370994 | A1* | 12/2019 | Norris ................. G06V 20/20 |

OTHER PUBLICATIONS

Fontinele, Jefferson, Gabriel Lefundes, and Luciano Oliveira. "Attention-based fusion of semantic boundary and non-boundary information to improve semantic segmentation." arXiv preprint arXiv:2108.02840 (2021). (Year: 2021).*

Knyaz, "Multimodal data fusion for object recognition", Proceedings of SPIE, Multimodal Sensing: Technologies and Applications, vol. 11059, Jun. 21, 2019, doi: 10.1117/12.2526067, pp. 1-12 (13 total pages).

Leopold et al., "PixelBNN: Augmenting the PixelCNN with Batch Normalization and the Presentation of a Fast Architecture for Retinal Vessel Segmentation," Journal of Imaging 2019, 5, 26, Feb. 2, 2019, doi: 10.3390/jimaging5020026, pp. 1-16.

International Search Report and Written Opinion issued in PCT Application No. PCT/US2020/024081, dated Jul. 7, 2020.

Chen et al., "Boundary-Aware Network for Fast and High-Accuracy Portrait Segmentation", arXiv.Org., Cornell University, Jan. 12, 2019, arXiv:1901.03814v1, https://doi.org/10.48550/arXiv.1901.03814, pp. 1-9.

Guan et al., "Edge-Aware Convolution Neural Network Based Salient Object Detection", IEEE Signal Processing Letters, vol. 26, No. 1, Jan. 1, 2019, pp. 114-118, ISSN: 1070-9908, doi: 10.1109/LSP.2018.2881835.

Takikawa et al., "Gated-SCNN: Gated Shape CNNs for Semantic Segmentation", arXiv.Org., Cornell University, Jul. 12, 2019, arXiv:1907.05740v1, https://doi.org/10.48550/arXiv.1907.05740, pp. 1-10.

Dadashzadeh et al., "HGR-Net: A Two-Stage Convolutional Neural Network for Hand gesture Segmentation and Recognition", arXiv.Org., Cornell University, Jun. 14, 2018, arXiv:1806.05653v1, https://doi.org/10.48550/arXiv.1806.05653, pp. 1-10.

Wang et al., "Gated Convolutional LSTM for Speech Commands Recognition", Springer International Publishing AG, part of Springer Nature 2018, Jun. 12, 2018, https://doi.org/10.1007/978-3-319-93701-4_53, pp. 669-681.

Non-Final Office Action issued in U.S. Appl. No. 16/825,192, dated Oct. 1, 2021.

Final Office Action issued in U.S. Appl. No. 16/825,192, dated Apr. 13, 2022.

Non-Final Office Action issued in U.S. Appl. No. 16/825,192, dated Aug. 5, 2022.

Notice of Allowance issued in U.S. Appl. No. 16/825,192, dated Feb. 16, 2023.

Bai et al., "Image Segmentation Using Directionlet-domain Hidden Markov Tree Models," IEEE, 2011, 978-1-4244-8442-3/11, pp. 1615-1618, 4 total pages.

Marmanis et al., "Classification with an edge: improving semantic image segmentation with boundary detection," ARXIV, arXiv:1612.01337v1 [cs:cv], Dec. 5, 2016, pp. 1-31, 31 total pages.

Che et al., "A segmentation method of yellow and green apple images based on visual attention mechanism," Journal of Jiangsu Agricultural Sciences, 34(6), 2018, doi: 10.3969/j.issn. 1000-4440.2018.06.021, pp. 1347-1353, 7 total pages.

* cited by examiner

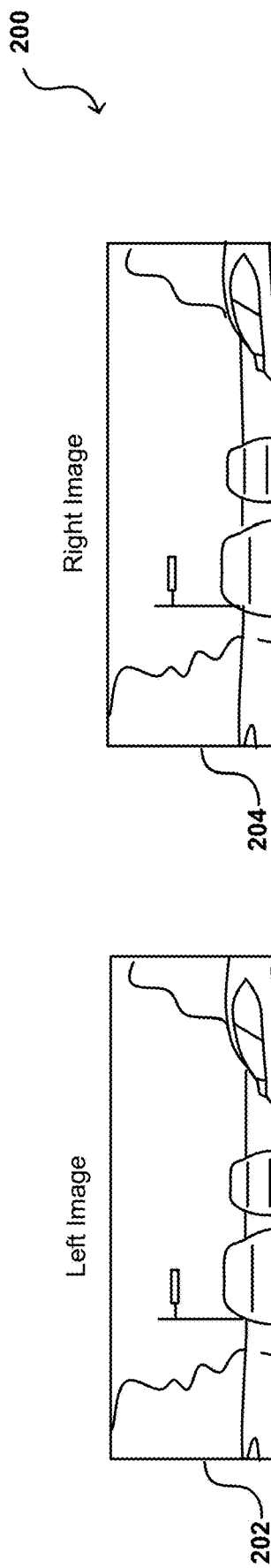
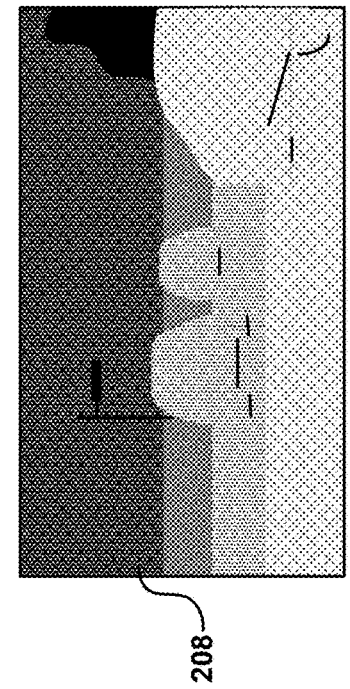
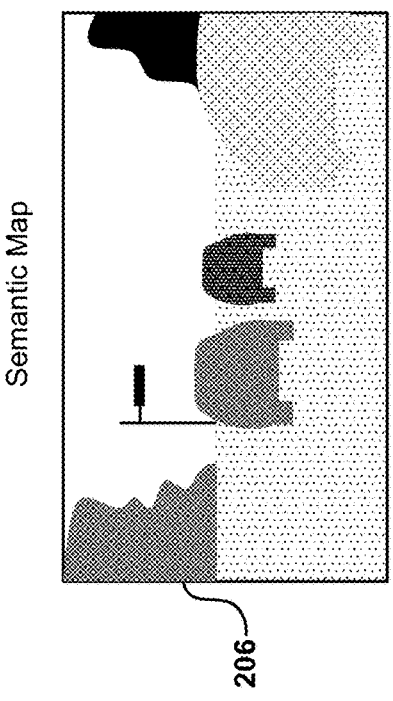
FIG. 2A
FIG. 2B
FIG. 2C
FIG. 2D

SHAPE FUSION FOR IMAGE ANALYSIS

CROSS-REFERENCE TO RELATED APPLICATIONS

This application is a continuation application and claims priority to U.S. patent application Ser. No. 16/825,192, filed Mar. 20, 2020, which claims the benefit of U.S. Provisional Patent Application No. 62/822,685, filed Mar. 22, 2019, and U.S. Provisional Patent Application No. 62/872,650, filed Jul. 10, 2019, each of which are incorporated by reference herein in their entirety.

BACKGROUND

Computer vision is being used for an increasing variety of tasks that come with ever-increasing performance demands. For applications such as autonomous or assisted driving or robotic control, accurate object classification can be critical. Conventional approaches do not always provide the level of precision needed for these and other such applications. For example, conventional methods for image segmentation form a dense image representation where the color, shape, and texture information are all processed together inside a deep neural network, which may not be ideal as these parameters contain very different amount of information that is relevant for recognition.

BRIEF DESCRIPTION OF THE DRAWINGS

Various embodiments in accordance with the present disclosure will be described with reference to the drawings, in which:

FIGS. 2A, 2B, 2C, and 2D illustrate images of objects in a nearby environment that can be analyzed, according to at least one embodiment;

DETAILED DESCRIPTION

Computer vision generally involves one or more computing devices analyzing image data (e.g., one or more images or video content) to attempt to determine or extract information about objects represented in that image data, such as to classify something about those objects. This can include, for example, analyzing high-dimensional data extracted from the captured image data to attempt to recognize objects, or types of objects, represented in the image data, and generate human-readable descriptions or labels identifying those objects. Various approaches can utilize a trained deep neural network to infer specific aspects of the captured image data, such as semantic boundaries for objects represented in the image data. The boundaries of these objects are referred to herein as semantic boundaries because each boundary can be associated with a semantic label or other semantic data, such as may identify a type of object defined by a given boundary. Such an approach can help to identify objects in the image data, as well as the shape, location, and potentially distance to those objects, which can be beneficial for applications that involve tasks such as navigation or component manipulation.

Figure 1:
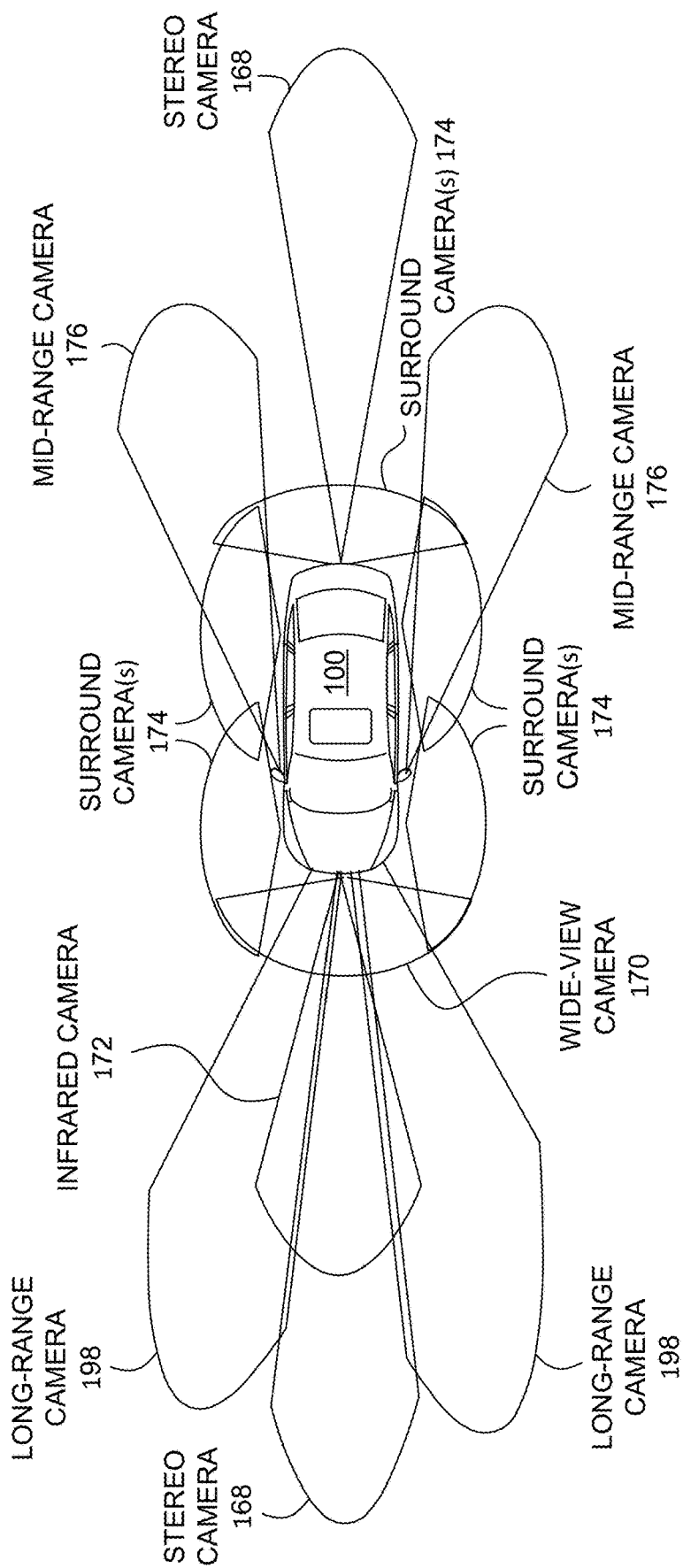
FIG. 1 illustrates a set of cameras of a vehicle that can be utilized, according to at least one embodiment.

FIG. 1 illustrates an example vehicle 100 that can utilize aspects of various embodiments for such purposes. As illustrated, the vehicle 100 includes a number of cameras or imaging sensors at various locations on the vehicle, in order to capture image data representative of an environment in which the vehicle is located. These can include at least two stereo camera assemblies, including front- and rear-facing stereo cameras 168. The stereoscopic data captured by these cameras can be used to recognize objects in front of, and behind, the vehicle 100, where the objects may include other vehicles, pedestrians, road signs, and the like. While the image data from either camera can be analyzed using computer vision to recognize types of these objects, the stereo aspect of the data enables the distances to those objects from the vehicle 100 to be determined. This can be important for tasks or applications such as pedestrian detection and collision avoidance, among others. In this example, dedicated stereo cameras can support disparity estimation, while any of these cameras can support optical flow or general computer vision determinations, as may include object recognition.

FIGS. 2A and 2B illustrate a left image 202 and a corresponding right image 204 of a stereoscopic pair of images captured from a front-facing stereoscopic camera of a vehicle. The individual images can be analyzed separately (or only a single image captured and analyzed) to recognize objects in the images, such as other vehicles, lane markers, and street signs. Where distance information is needed, differences in locations of these objects in the images 202, 204 can be used to determine the disparity, or distance from the front-facing camera to these objects. In some embodiments, data from at least one of these images can be used to generate a semantic map 206 as illustrated in FIG. 2C, which includes an identification of objects recognized in the image data, as well as an indication of a type of each object. In embodiments where distance information is needed as well, disparity information can be used with the semantic segmentation to create a depth map 208 as illustrated in FIG. 2D, wherein the distances of various recognized objects can be represented by varying color or shade, with lighter colored objects being closer to the camera in this example, than darker colored objects. When combined with the computer vision data, such depth data can provide not only the identification of nearby objects, but also the relative distance to those objects. By monitoring this information over time, other information can be determined as well, such as relative velocity and heading, which can be important for tasks such as navigation.

As mentioned, a process such as image segmentation can utilize representations of color, shape, and texture information that are processed together inside a network, such as a deep convolutional neural network (CNN), but such an approach may not be ideal as they contain very different types of information relevant for recognition. Approaches in accordance with various embodiments instead utilize a multi-stream CNN architecture for image analysis (e.g., semantic segmentation) that determines shape information as a separate processing branch, or "shape stream," that can process information in parallel to a primary stream, such as may utilize a conventionally-trained neural network for performing image analysis. In at least one embodiment, higher-level activations in the primary stream can be used to gate lower-level activations in the shape stream. This can help to remove noise and enable the shape stream to focus on processing relevant boundary-related information. In at least one embodiment, a very shallow architecture can be used for the shape stream that operates on the image-level resolution, producing sharp predictions around object boundaries and significantly boosting performance on thinner and smaller objects with respect to approaches that do not utilize a shape stream.

A primary stream can utilize a Convolutional Neural Network (CNN) in at least one embodiment, such as to perform image semantic segmentation. In such a network, fully-connected layers of a conventional CNN can be converted into convolutional layers. Using classification architectures for dense pixel prediction by itself can have several drawbacks, as may be related to a loss in spatial resolution of the output due to the use of pooling layers. Specialized CNNs can then be used to help restore the spatial resolution of the network output. To obtain the desired accuracy in produced results, it can be beneficial to look at a complete and detailed object boundary to get a discriminative encoding of shape, while color and texture may contain fairly low-level information. Incorporating additional connectivity helps the different types of information to flow across different scales of network depth.

Figure 3:
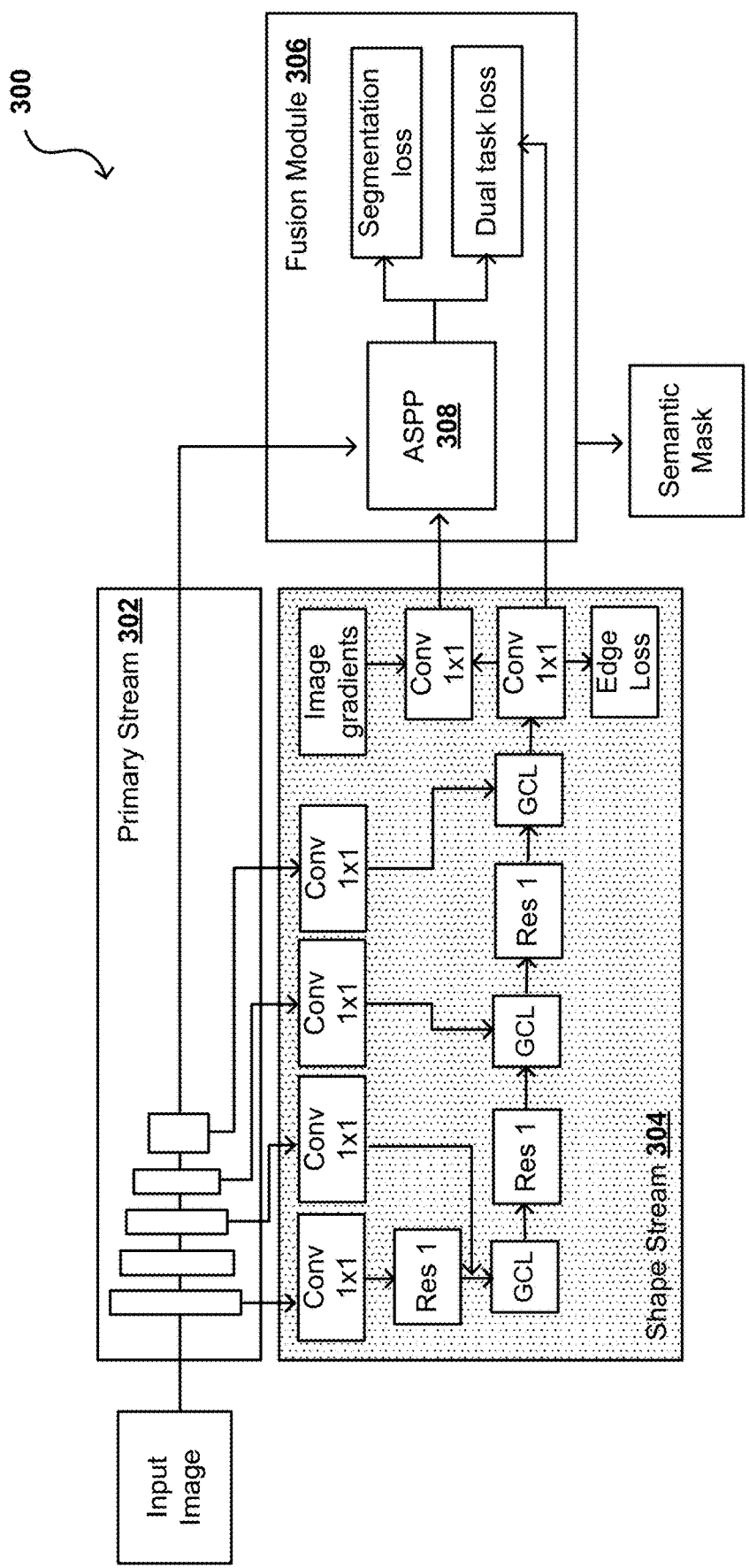
FIG. 3 illustrates an example image processing pipeline, according to at least one embodiment.

Approaches in accordance with various embodiments can utilize a multi-stream (e.g., a two-stream) CNN architecture 300 for semantic segmentation, such as that illustrated in FIG. 3. Such architecture 300 can explicitly wire shape information as a separate processing branch. In particular, the architecture can include a primary stream 320 that utilizes an image analysis network, such as a classical CNN useful for semantic segmentation. The architecture 300 can also include a separate, parallel processing branch, referred to herein as a shape stream 304. In at least one embodiment the primary stream 302 and shape stream 304 can operate in parallel, with information from those streams not being fused until the very top layers. In at least one embodiment, this architecture 300 uses a gating mechanism to connect intermediate layers of the parallel streams. It should be understood that the number of layers illustrated in the shape stream 304 is only an example, and that there can be different numbers of layers utilized in other embodiments. Fusion of information between streams 302, 304 is performed near an end of the pipeline using a fusion module 306. To predict high-quality boundaries, a loss function can be utilized in training that encourages the predicted semantic segmentation masks to align with ground-truth boundaries. In this example, data provided as input to the shape stream 304 comes from successive convolutional layers of the shape stream. The data in at least one embodiment would include features representative of the image encoded at the respective layer. The feature data from successive layers helps to identify and remove portions of the image that do not correspond to boundaries, as the data from the primary stream can function as a sequence of attention maps.

In at least one embodiment a specific type of gate can be used to allow the parallel branches to interact. This can enable higher-level information contained in the classical stream to be utilized to de-noise activations in the shape stream in very early stages of processing. By doing so, the shape stream 304 can focus on processing relevant information. To ensure that shape information is directed to the desired stream, the network can be supervised with a semantic boundary loss. A second loss function can be used that encourages the predicted semantic segmentation to correctly align with the ground-truth semantic boundaries, which further encourages the fusion module 306 (or layer(s)) to exploit information coming from the shape stream 304.

In at least one embodiment, the primary stream 302 of the network can be any backbone architecture, as may include a conventional segmentation CNN. The shape stream 304 can process shape information in the form of semantic boundaries. The shape stream can be caused to only process boundary-related information through a set of residual blocks, as well as the use of at least one gated convolution layer (GCL), as well as local supervision. In at least one embodiment, semantic-region features from the primary stream and boundary features from the shape stream can be fused in the fusion module 306 to produce a refined segmentation result, particularly around boundaries. A fusion module 306 in at least one embodiment can combine information from the two streams in a multi-scale fashion using, for example, an Atrous Spatial Pyramid Pooling module (ASPP). High quality boundaries on the segmentation masks can be ensured using, for example, a dual task regularizer.

In at least one embodiment, a primary stream 302, denoted as $\mathcal{R}_\theta(I)$ with parameter $\theta$, takes image $I \in \mathbb{R}^{3 \times H \times W}$ with height H and width W as input, and produces dense pixel features. The primary stream 302 in at least one embodiment can be any feedforward fully-convolutional network, such as a ResNet-based or VGG-based semantic segmentation network. In one embodiment, a ResNet-like architecture such as ResNet-101 and WideResNet can be used for the primary stream. The output feature representation of the primary stream can be given by:

$$r \in \mathbb{R}^{C \times \frac{H}{m} \times \frac{W}{m}}$$

where m is the stride of the primary stream.

In at least one embodiment, the shape stream 304 can be denoted as $\mathcal{S}_\phi$, with parameters $\phi$, and can take image gradients $\nabla I$ as well as output of the first convolutional layer of the primary stream as input. The shape stream can then produce semantic boundaries as output. In at least one embodiment, the architecture is composed of a few residual blocks (e.g., Res 1 in the figure) interleaved with gated convolution layers (GCL). The gated convolutional layers can help to ensure that the shape stream only processes boundary-relevant information. The output boundary map of the shape stream can be denoted as $s \in \mathbb{R}^{H \times W}$. Since ground-truth (GT) binary edges can be obtained from GT semantic segmentation masks, the supervised binary cross-entropy loss can be used on output boundaries to supervise the shape stream.

In at least one embodiment fusion module 306, which can be denoted as $\mathcal{F}_\gamma$, with parameter $\gamma$, can take as input the dense feature representation r coming from the regular branch and fuse this representation with the boundary map s output by the shape branch in a way that multi-scale contextual information is preserved. Region features can be combined with boundary features and a refined semantic segmentation output. In at least one embodiment, for a segmentation prediction of K semantic classes, a categorical distribution can be output as may be given by:

$$f = p(y \backslash s, r) = \mathcal{F}_\gamma(s, r) \in \mathbb{R}^{K \times H \times W},$$

which represents a probability that pixels belong to each of the K classes. In at least one embodiment the boundary map s can be merged with the dense feature representation r using ASPP. As mentioned, allows preserve the multi-scale contextual information to be preserved.

Since tasks such as estimating semantic segmentation and semantic boundaries are closely related, a gated convolutional layer (GCL) can be utilized that facilitates flow of information from the primary stream 302 into the shape stream 304. A GCL can help to ensure that the shape stream 304 only processes relevant information by filtering out information determined to be irrelevant to shape or boundaries. It should be noted that in this architecture the shape stream does not incorporate features from the primary stream, but instead utilizes GCL to deactivate its activations that are not deemed relevant by the higher-level information contained in the primary stream. This can be thought of as a collaboration between two parallel streams, where the more powerful stream, which has formed a higher-level semantic understanding of a scene, helps the other stream to focus only on relevant portions. Such an approach allows the shape stream to adopt an effective shallow architecture that processes images at a very high resolution.

GCL can be used in multiple locations between the primary stream 302 and the shape stream 304. For example, letting m denote the number of locations, and letting $t \in 0, 1, \ldots, m$ be a running index where $r_t$ and $s_t$ denote intermediate representations of the corresponding regular and shape streams that are processed using a GCL. To apply GCL, an attention map $\alpha_t \in \mathbb{R}^{H \times W}$ is obtained by concatenating $r_t$ and $s_t$ followed by a normalized 1×1 convolutional layer $C_{1 \times 1}$, which in turn is followed by a sigmoid function $\sigma$, as may be given by:

$$\alpha_t = \sigma(C_{1 \times 1}(s_t \| r_t))$$

where $\|$ denotes concatenation of feature maps. Given the attention map $\alpha_t$, GCL is applied on $s_t$ as an element-wise product $\odot$ with attention map $\alpha$ followed by a residual connection and channel-wise weighting with kernel $w_t$. At each pixel (i,j) GCL $\odot$ can be computed, as may be given by:

$$\hat{s}_t^{i,j} = (s_t \odot w_t)_{(i,j)} = ((s_{t_{(i,j)}} \odot \alpha_{t_{(i,j)}})^T w_t$$

In at least one embodiment, $\hat{s}_t$ is then passed on to the next layer in the shape stream for further processing. Both the attention map computation and gated convolution are differentiable and therefore backpropagation can be performed end-to-end. Intuitively, $\alpha$ can also be seen as an attention map that weights more heavily areas with important boundary information. In at least one embodiment, three GCLs can be used that are connected to the third, fourth, and last layer of the primary stream. Bilinear interpolation can be used if needed to upsample the feature maps coming from the primary stream.

Figure 5:
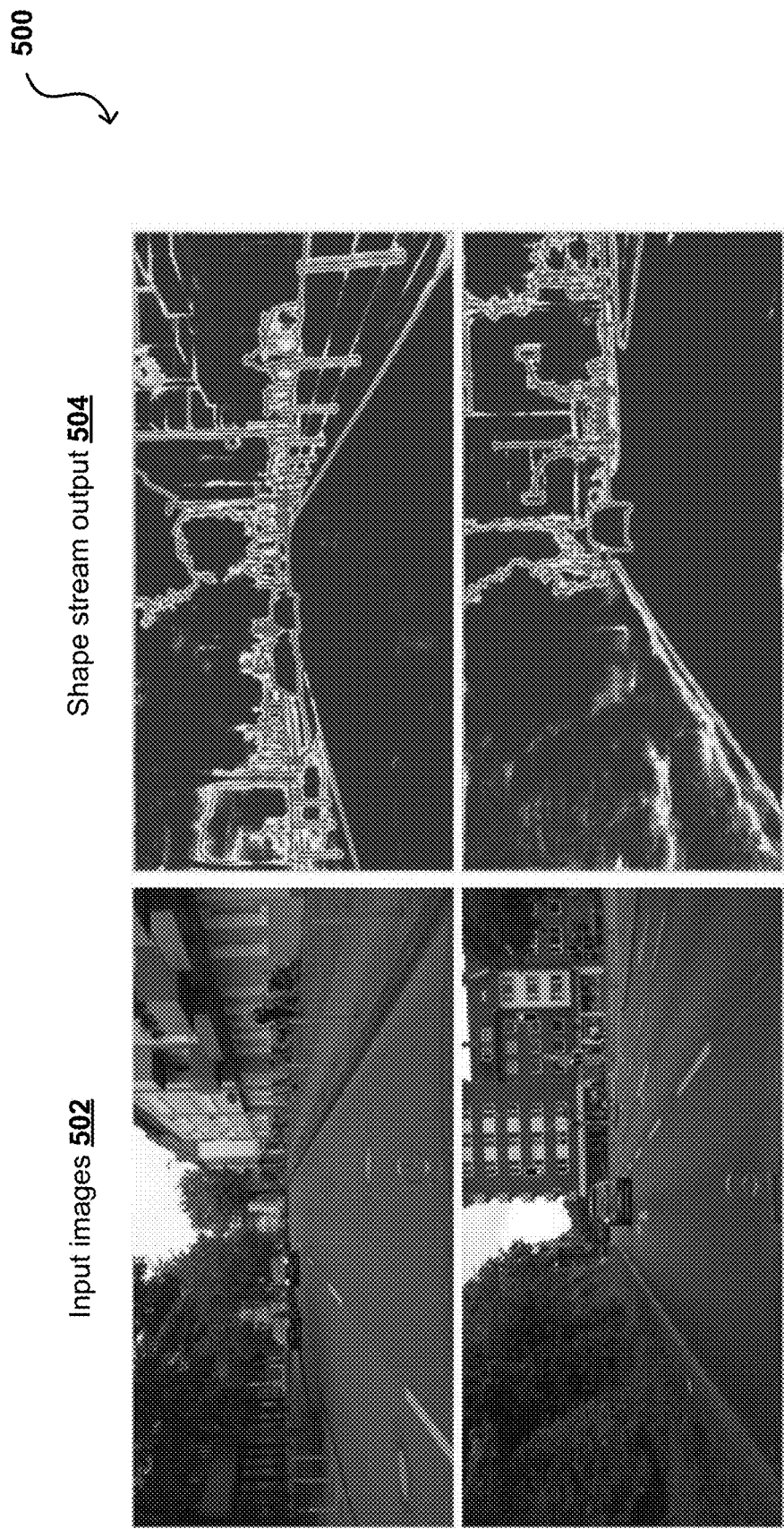
FIG. 5 illustrates shape stream output for input images, according to at least one embodiment.

In at least one embodiment, the primary and shape streams can be trained jointly, together with the fusion module, in an end-to-end fashion. Segmentation and boundary map prediction can be jointly supervised during training. In this case, the boundary map can be a binary representation of all outlines of objects and object classes in the scene, such as is illustrated in FIG. 5. A binary cross-entropy (BCE) loss can be used with predicted boundary maps s and cross-entropy (CE) loss used with predicted semantic segmentation f, as may be given by:

$$\mathcal{L}^{\theta \phi, \gamma} = \lambda_1 \mathcal{L}_{BCE}^{\theta, \phi}(s, \hat{s}) + \lambda_2 \mathcal{L}_{CE}^{\theta \phi, \gamma}(\hat{y}, f)$$

where $\hat{s} \in \mathbb{R}^{H \times W}$ denotes GT boundaries and $\hat{y} \in \mathbb{R}^{H \times W}$ denotes GT semantic labels. Here, $\lambda_1, \lambda_2$ are two hyperparameters that control the weighting between the losses.

As illustrated in FIG. 3, BCE supervision on boundary maps s is performed before feeding these maps into fusion module 306. Thus, the BCE loss $\mathcal{L}_{BCE}^{\theta, \phi}$ updates the parameters of both the primary and shape streams. A final categorical distribution $f$ of semantic classes can be supervised with CE loss $\mathcal{L}_{CE}^{\theta \phi, \gamma}$ at the end, updating all the network parameters. In the case of BCE on boundaries, a coefficient $\beta$ can be used to account for a high imbalance between boundary and non-boundary pixels.

As mentioned above, $p(y \backslash r, s) \in \mathbb{R}^{K \times H \times W}$ can denote a categorical distribution output of the fusion module. Let $\zeta = \mathbb{R}^{H \times W}$ be a potential that represents whether a particular pixel belongs to a semantic boundary in the input image I. This value can be is computed by taking a spatial derivative on segmentation output as may be given by:

$$\zeta = \frac{1}{\sqrt{2}} \left\| \nabla \frac{(G * \arg\max_k p(y^k | r, s))}{k} \right\|$$

where G denotes the Gaussian filter. If it is assumed that $\hat{\mathcal{L}}$ is a GT binary mask computed in the same way from the GT semantic labels $\hat{f}$, a loss function can be utilized as may be given by:

$$\mathcal{L}_{reg \to}^{\theta \phi, \gamma} = \lambda_3 \sum_{p^+} |\zeta(p^+) - \hat{\zeta}(p^+)|$$

where ($p^+$) contains the set of all non-zero pixel coordinates in both $\zeta$ and $\hat{\zeta}$. It can be desirable to ensure that boundary pixels are penalized when there is a mismatch with GT boundaries, and to avoid non-boundary pixels to dominate the loss function. It can be noted that the above regularization loss function exploits the duality between boundary prediction and semantic segmentation in the boundary space.

In at least one embodiment, the boundary prediction from the shape stream $s \in \mathbb{R}^{H \times W}$ can be used to ensure consistency between the binary boundary prediction s and the predicted semantics p(y|r, s), as may be given by:

$$\mathcal{L}_{reg\leftarrow}^{\theta\phi,\gamma} = \lambda_4 \sum_{k,p} \mathbb{1}_{s_p} \left[ \hat{y}\frac{k}{p} \log py\frac{k}{p} | r, s \right]$$

where p and k runs over all image pixels and semantic classes, respectively. In this case, $\mathbb{1}_s = \{1: s > thrs\}$ corresponds to the indicator function and thrs is a confidence threshold, such as 0.8. A total dual task regularizer loss function can thus be given by:

$$\mathcal{L}^{\theta\phi,\gamma} = \mathcal{L}_{reg\rightarrow}^{\theta\phi,\gamma} + \mathcal{L}_{reg\leftarrow}^{\theta\phi,\gamma}$$

In this case, $\lambda_3$, $\lambda_4$ are two hyper-parameters that control the weighting of the regularizer.

In order to back-propagate through the above loss function, gradients of spatial derivative on segmentation output can be determined. For example, letting $g = \|\cdot\|$, the partial derivatives with respect to a given parameter η can be given by:

$$\frac{\partial L}{\partial \eta_i} = \sum_{j,l} \nabla G * \frac{\partial L}{\partial \zeta_j} \frac{\partial \zeta_j}{\partial g_l} \frac{\partial \arg\max_k p(y^k)l}{\partial \eta_i}$$

Since arg max is not a differentiable function a Gumbel softmax trick can be utilized. During a backward pass, the argmax operator can be approximated with a softmax with temperature τ, as may be given by:

$$\frac{\partial \arg\max_k p(y^k)}{\partial \eta_i} = \nabla \eta_i \frac{\exp\left(\frac{\log p(y_k) + g_k}{\tau}\right)}{\sum_j \exp\left(\frac{\log p(y_j) + g_j}{\tau}\right)}$$

where $g_j \sim \text{Gumbel}(0,I)$ and τ a hyper-parameter. The operator $\nabla G*$ can be computed by filtering with a Sobel kernel.

In at least one embodiment, a Deeplab v3+ methodology can be utilized, but with simpler encoders. Networks can be implemented using, for example, PyTorch. At least one embodiment can utilize 800×800 as a training resolution and synchronized batch norm. Training can be performed on a workstation, such as an NVIDIA DGX Station using 8 GPUs with a total batch size of 16. For cityscapes, a learning rate of 1e-2 can be used with a polynomial decay policy. A training process can be run for 100 epochs for ablation, for example. For a joint loss, values can be set such as $\tau_1 = 20$, $\tau_2 = 1$, $\tau_3 = 1$, and $\tau_4 = 1$, with τ=1 for the Gumbel softmax.

Figure 4:
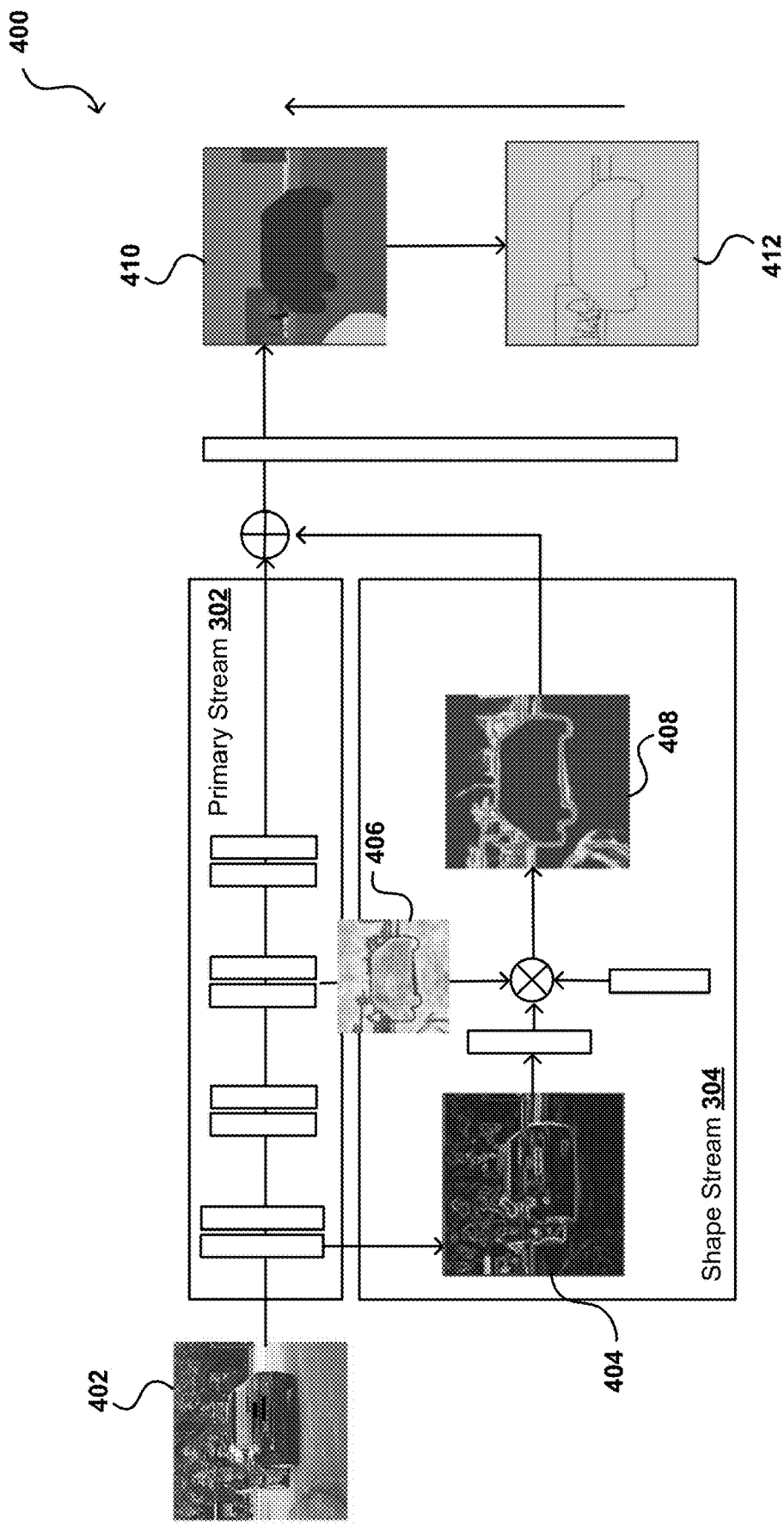
FIG. 4 illustrates data at various states through an image processing pipeline, according to at least one embodiment.

FIG. 4 illustrates states of data passing through an analysis pipeline 400 in accordance with at least one embodiment. In this example, an image 402 including a representation of a vehicle is provided as input to the pipeline, first passing to a primary stream 30 for analysis, such as for determining a semantic segmentation using a deep CNN. In this example, data 404, 406 from layers of the primary stream network are provided as input to the network of the shape stream 304. As illustrated, the data 404, 406 received from different layers of the primary stream network will be different, and can be analyzed together to produce shape data 408 that is a relatively accurate representation of the shapes of the objects in the input image, as illustrated by the accurate shape of the vehicle in the shape data 408. The shape data 408 can be combined with output from the primary stream at a fusion network or fusion layer, which can produce a semantic segmentation mask 410, from which boundary data 412 can be generated. As illustrated, the semantic segmentation mask 410 retains the semantic information, indicating types of object recognized from the image (or at least distinguishing between different objects if not identified). As mentioned, a dual task regularizer can be used, with a dual task loss function encouraging the predicted semantic segmentation masks to align with ground-truth boundaries to ensure high-quality boundary predictions. In at least one embodiment, this enables the semantic boundaries to influence the semantic masks, as well as the semantic masks to influence the semantic boundaries.

Figure 6A:
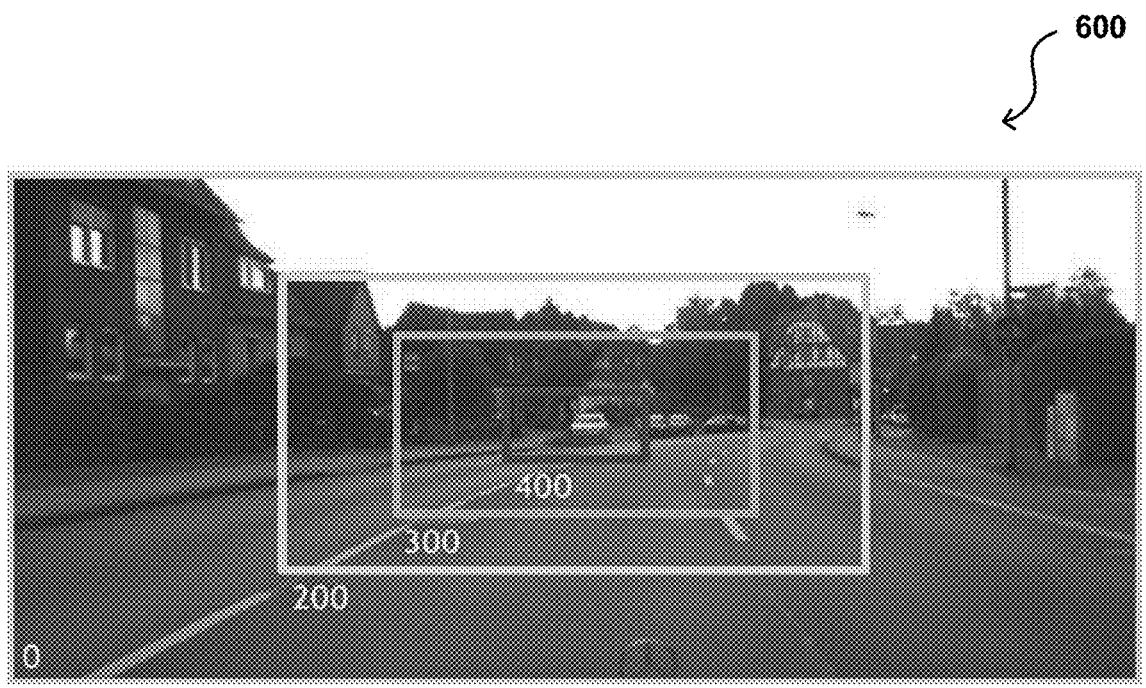
FIGS. 6A and 6B illustrate semantic segmentations for different views of an image, according to at least one embodiment.
Figure 6B:
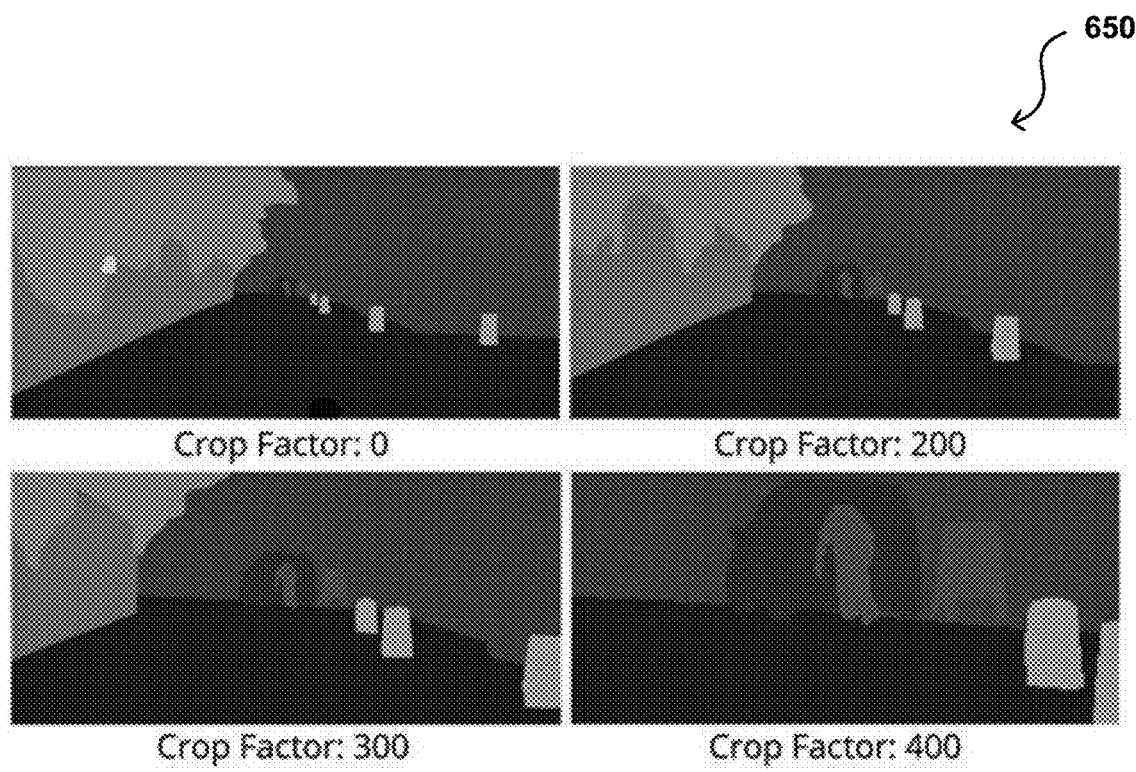
Figure 7:
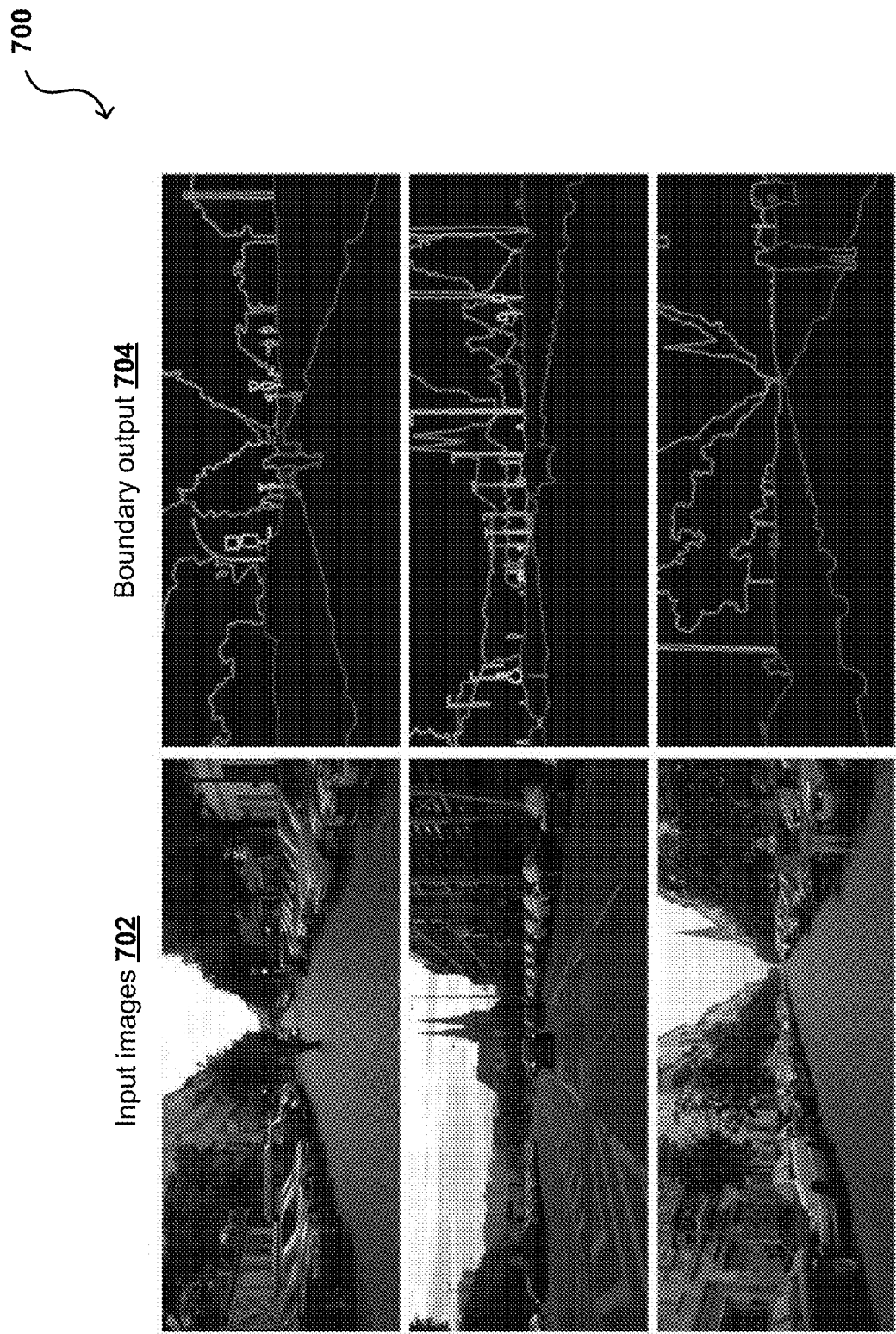
FIG. 7 illustrates boundary output for a set of input images, according to at least one embodiment.

FIG. 5 illustrates examples 500 of shape data output by a shape stream for a pair of input images. As illustrated, the input images have a variety of objects of different sizes, shapes, and positions. The shape stream output for each produces highly accurate shape data, distinguishing between different objects and being able to determine an outer shape of these objects without generating false object shapes due to features or patterns within or on a surface of those objects. FIG. 6A illustrates an input image 600 that can have several different portions considered, as may be based upon different image croppings, to help obtain more accurate data for different distance ranges. As illustrated, each crop region corresponds to a different range of distance, such as by having points that are no closer than a determinable distance. As illustrated in the views 650 of FIG. 6B, this can help to obtain greater levels of detail for objects that are further in the distance, as a sematic segmentation mask at crop factor 0 can make determining objects in the distance difficult, but by going to a crop factor of 400 it can more easily be determined that there is a person behind a vehicle in the distance. Different crops can therefore be used for distance-based evaluation, producing different predictions at different crop factors. The use of shape data has been demonstrated to produce more accurate results at each of these different crop factors. FIG. 7 illustrates views 700 of resulting boundary output data for three different input images. As illustrated, the boundary data provides an accurate overview of objects and features contained in the input images. In at least one embodiment, the boundary data can be color coded or otherwise labeled in order to retain the semantic information determined from the primary stream and that may have otherwise been represented in the semantic segmentation.

Figure 8:
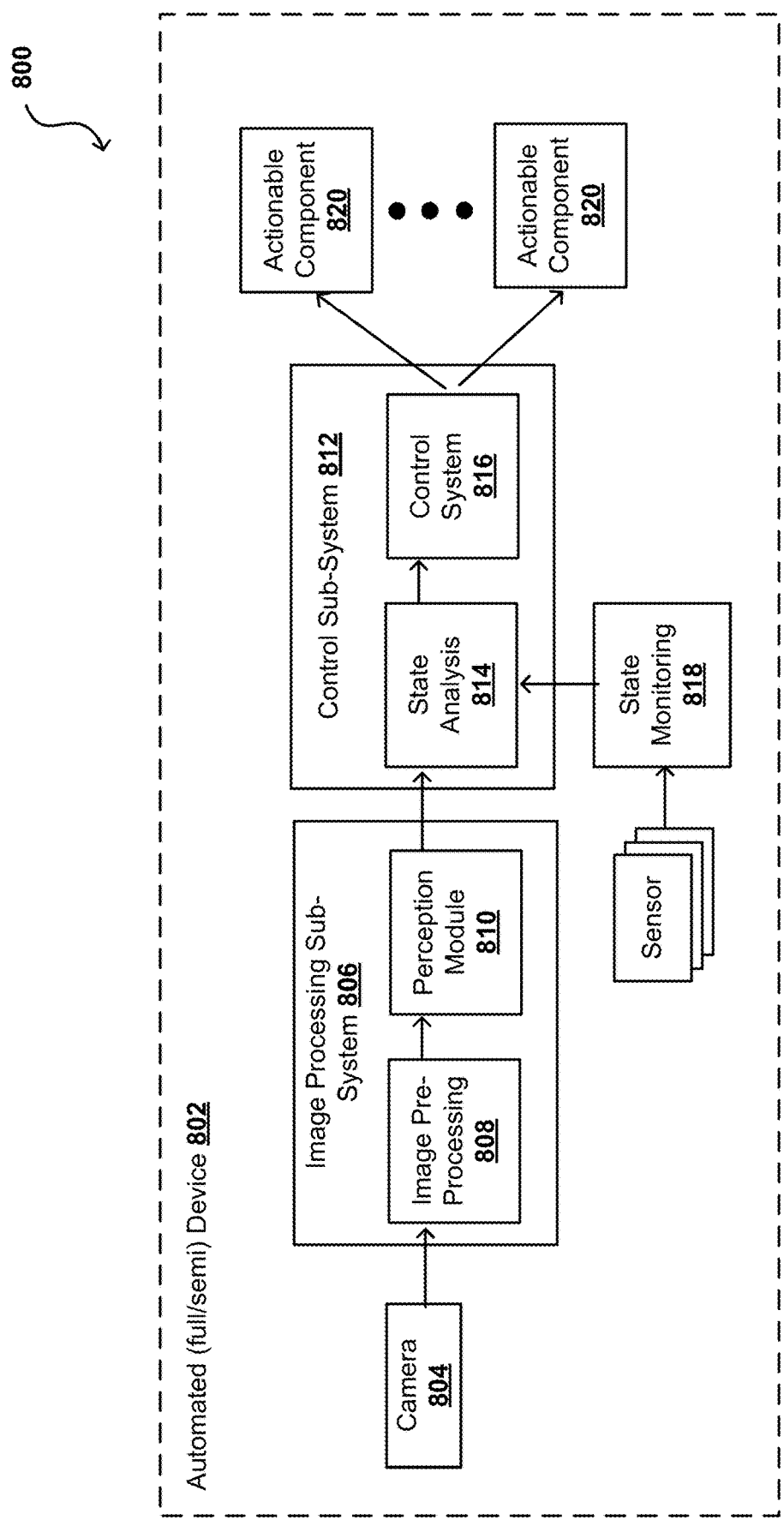
FIG. 8 illustrates components of an automated or semi-automated device, according to at least one embodiment.

FIG. 8 illustrates an example system architecture 800 that can be utilized in accordance with at least one embodiment. In this example, the architecture is utilized as part of an automated device 802. This can be a fully automated device, such as an autonomous vehicle or unmanned robot, or a semi-automated vehicle, such as a vehicle with driver assistance. In this example, at least one camera 804 can be used to capture image data of an environment in which the automated device 802 is located. The image data can be provided to an image-processing sub-system 806, which can include a pre-processing module 808 to perform any desired or necessary pre-processing of the image data. The image data can then be passed to a perception module 810, which can be based on a multi-stream architecture as discussed herein. This can include processing data with primary and shape streams, then fusing the information to produce semantic boundary data in at least one embodiment in order to cause the boundary determination to consider shape as discussed herein. Generated semantic boundary data can be provided to a control sub-system 812 of the automated device 802. In this sub-system, a state analysis module 814 can accept the boundary data as information about a current state of the environment, and may also accept state information for the automated device 802 as may be obtained from a set of sensors via a state monitoring sub-system. The state information can include any relevant information, such as location, orientation, motion, temperature, pressure, and the like. The state analysis module 814 can then determine one or more actions to take, such as to adjust a path of navigation based on the current location and direction of the device, as well as an object in the environment detected using the semantic boundary information. The state analysis module 814 can then provide instructions to a control system 816, which can generate and provide actionable instructions to one or more actionable components 820, which for a vehicle may include steering, acceleration, and braking components or assemblies, among other such options.

Figure 9:
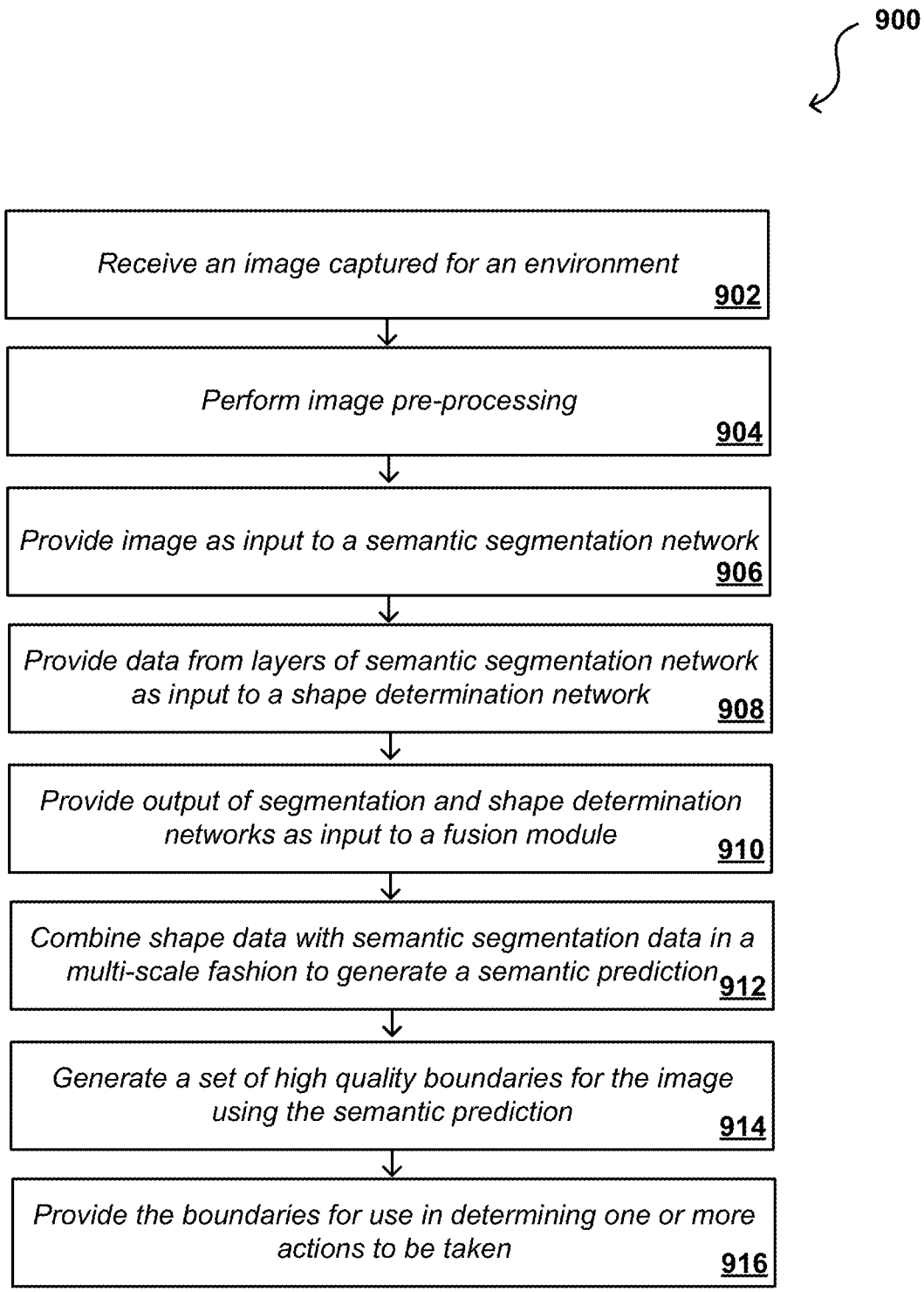
FIG. 9 illustrates a process for determining actions to take based in part upon boundaries determined from image data, according to at least one embodiment.

FIG. 9 illustrates an example process 900 for determining boundaries from input image data that can be utilized in accordance with various embodiments. It should be understood for this and other processes discussed herein that there can be additional, alternative, or fewer steps performed in similar or alternative orders, or in parallel, within the scope of the various embodiments unless otherwise stated. In at least one embodiment, such a process can be implemented using a two-stream CNN architecture for semantic segmentation that wires shape into a separate parallel stream, wherein a gating mechanism is used to connect the intermediate layers and a loss function is used that exploits the duality between the tasks of semantic segmentation and semantic boundary prediction. Such an architecture can produce sharp predictions around object boundaries and can significantly boost performance on thinner and smaller objects.

In this example, an image is received 902 that was captured for an environment. This can include a single still image, an image of a set or sequence of images, or a frame of video or streaming image data, among other such options. In this example, at least some pre-processing can be performed 904, such as to remove noise, adjust a resolution, adjust image quality parameters, perform lens error correction, or adjust a color depth, among other such options. One any pre-processing has completed, the image can be provided 906 as input to a semantic segmentation network. It should be understood that the term "image" is used in many examples for simplicity of explanation, but in at least some embodiments and situations image data may be utilized as well, which may not be in the form of a complete image of a standard image format. The image can be processed through a primary branch of the architecture, such as a deep convolutional neural network trained for semantic segmentation. Data from layers of this semantic segmentation network can be provided 908 as input to a shape determination network of a shape branch of the architecture. As mentioned, data can be processed by the shape determination and semantic segmentation networks in parallel. Output of the segmentation and shape determination networks can then be provided 910 as input to a fusion module, such as may include an ASPP module for fusion. The shape data can then be combined 912 or fused with the semantic segmentation data in a multi-scale fashion to generate a semantic prediction, such as a semantic segmentation mask. Based at least in part upon this semantic prediction data, a set of high quality boundaries can be generated 914 for the input image. Data for these boundaries can then be provided 916 for use in determining one or more actions to be taken. For an autonomous vehicle this may involve instructing a navigation action, where for robotics this may involve an arm manipulation action or for security it may involve triggering an alarm, among other such options.

Figure 10:
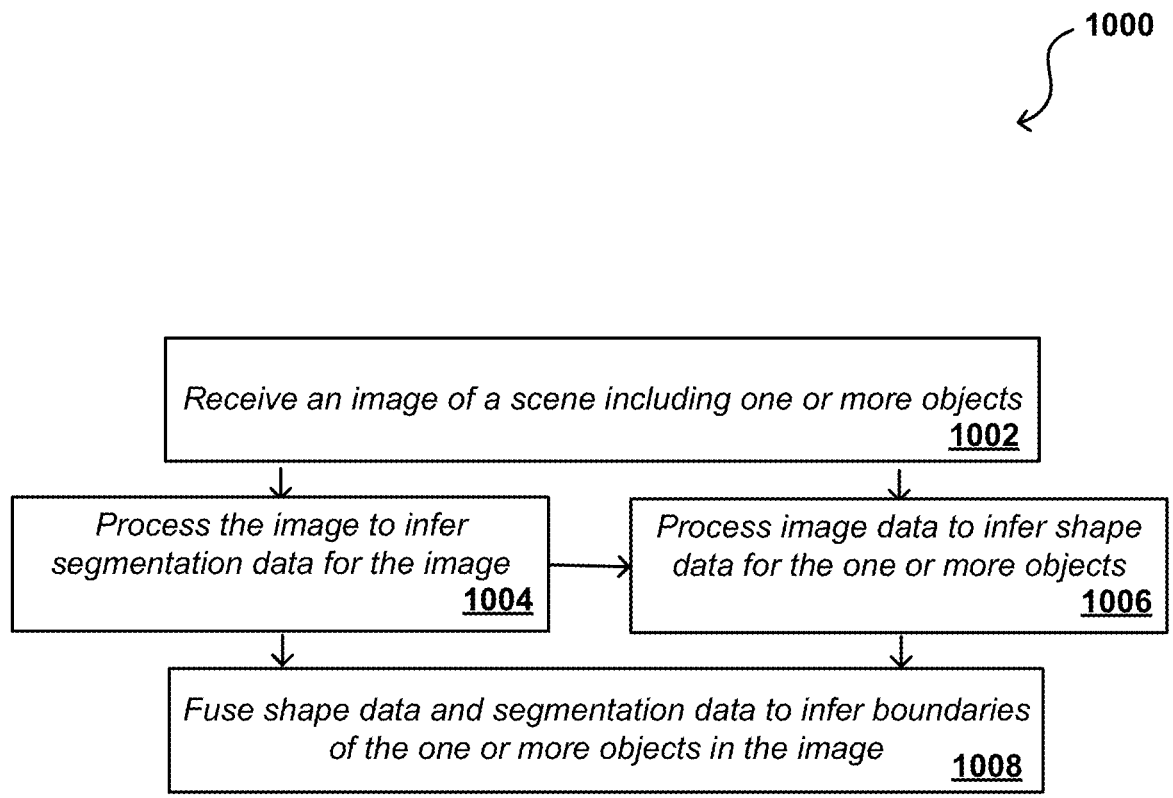
FIG. 10 illustrates a process for analyzing image data, according to at least one embodiment.

FIG. 10 illustrates an example process 1000 for predicting object boundaries for an image that can be utilized in accordance with at least one embodiment. In this example, an image is received 1002 that includes a representation of one or more objects. The image can be processed 1004 to infer segmentation data for the image. In parallel, data for the image can be processed 1006 to infer shape data for the one or more objects. In this example, the data for the image is received from layers of a network processing the image to infer the segmentation. The shape data and segmentation data can then be fused 1008 or otherwise combined or analyzed together to infer boundaries of the one or more objects in the image. In at least one embodiment, the fusion is performed using layers of a trained fusion network. In at least one embodiment, the boundaries will include semantic information determined for the one or more objects, such as information about the types of objects or identification of those objects.

Inference and Training Logic

Figure 11A:
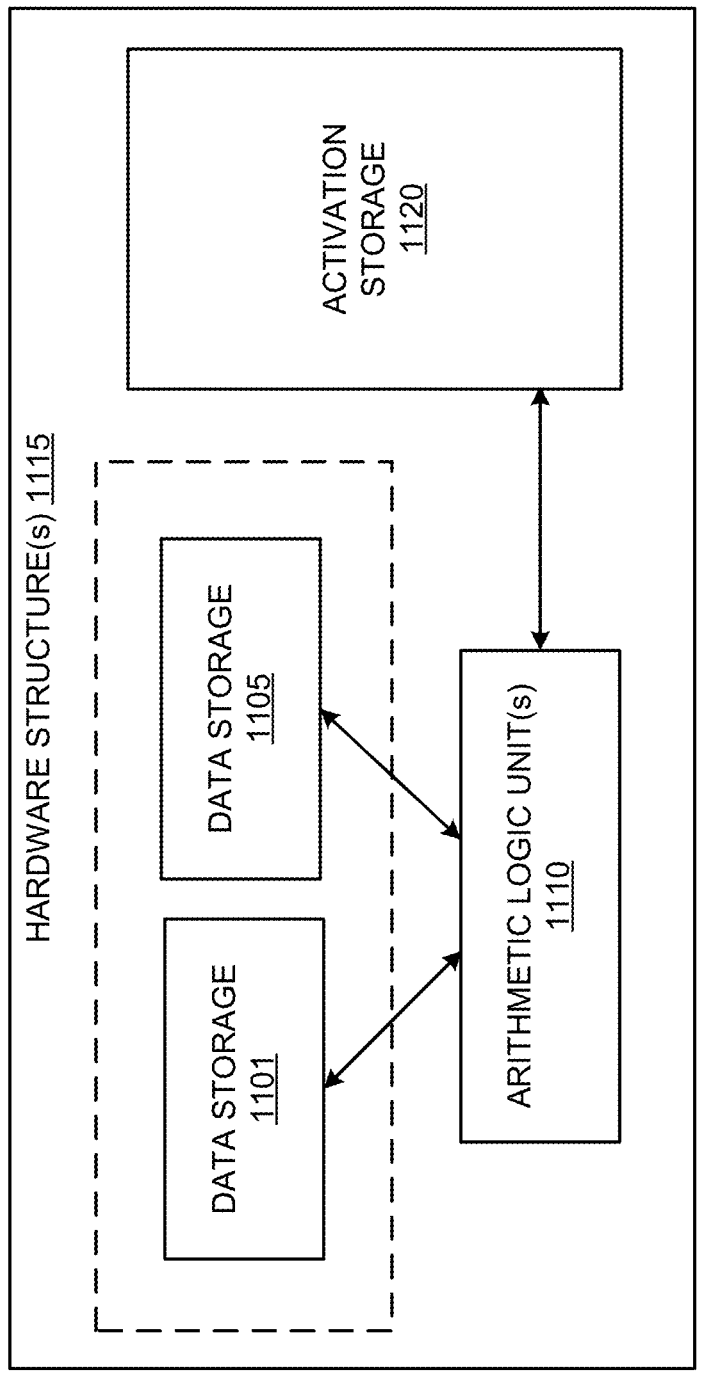
FIG. 11A illustrates inference and/or training logic, according to at least one embodiment.

FIG. 11A illustrates inference and/or training logic 1115 used to perform inferencing and/or training operations associated with one or more embodiments. Details regarding inference and/or training logic 1115 are provided below in conjunction with FIGS. 11A and/or 11B.

In at least one embodiment, inference and/or training logic 1115 may include, without limitation, code and/or data storage 1101 to store forward and/or output weight and/or input/output data, and/or other parameters to configure neurons or layers of a neural network trained and/or used for inferencing in aspects of one or more embodiments. In at least one embodiment, training logic 1115 may include, or be coupled to code and/or data storage 1101 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 1101 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1101 may be included with other on-chip or off-chip data storage, including a processor's L1, L2, or L3 cache or system memory.

In at least one embodiment, any portion of code and/or data storage 1101 may be internal or external to one or more processors or other hardware logic devices or circuits. In at least one embodiment, code and/or code and/or data storage 1101 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1101 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1115 may include, without limitation, a code and/or data storage 1105 to store backward and/or output weight and/or input/output data corresponding to neurons or layers of a neural network trained and/or used for inferencing in aspects of one or more embodiments. In at least one embodiment, code and/or data storage 1105 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1115 may include, or be coupled to code and/or data storage 1105 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1105 may be included with other on-chip or off-chip data storage, including a processor's L1, L2, or L3 cache or system memory. In at least one embodiment, any portion of code and/or data storage 1105 may be internal or external to on one or more processors or other hardware logic devices or circuits. In at least one embodiment, code and/or data storage 1105 may be cache memory, DRAM, SRAM, non-volatile memory (e.g., Flash memory), or other storage. In at least one embodiment, choice of whether code and/or data storage 1105 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1101 and code and/or data storage 1105 may be separate storage structures. In at least one embodiment, code and/or data storage 1101 and code and/or data storage 1105 may be same storage structure. In at least one embodiment, code and/or data storage 1101 and code and/or data storage 1105 may be partially same storage structure and partially separate storage structures. In at least one embodiment, any portion of code and/or data storage 1101 and code and/or data storage 1105 may be included with other on-chip or off-chip data storage, including a processor's L1, L2, or L3 cache or system memory.

In at least one embodiment, inference and/or training logic 1115 may include, without limitation, one or more arithmetic logic unit(s) ("ALU(s)") 1110, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1120 that are functions of input/output and/or weight parameter data stored in code and/or data storage 1101 and/or code and/or data storage 1105. In at least one embodiment, activations stored in activation storage 1120 are generated according to linear algebraic and/or matrix-based mathematics performed by ALU(s) 1110 in response to performing instructions or other code, wherein weight values stored in code and/or data storage 1105 and/or code and/or data storage 1101 are used as operands along with other values, such as bias values, gradient information, momentum values, or other parameters or hyperparameters, any or all of which may be stored in code and/or data storage 1105 or code and/or data storage 1101 or another storage on or off-chip.

In at least one embodiment, ALU(s) 1110 are included within one or more processors or other hardware logic devices or circuits, whereas in another embodiment, ALU(s) 1110 may be external to a processor or other hardware logic device or circuit that uses them (e.g., a co-processor). In at least one embodiment, ALUs 1110 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1101, code and/or data storage 1105, and activation storage 1120 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1120 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1120 may be cache memory, DRAM, SRAM, non-volatile memory (e.g., Flash memory), or other storage. In at least one embodiment, activation storage 1120 may be completely or partially within or external to one or more processors or other logical circuits. In at least one embodiment, choice of whether activation storage 1120 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1115 illustrated in FIG. 11A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1115 illustrated in FIG. 11A may be used in conjunction with central processing unit ("CPU") hardware, graphics processing unit ("GPU") hardware or other hardware, such as field programmable gate arrays ("FPGAs").

Figure 11B:
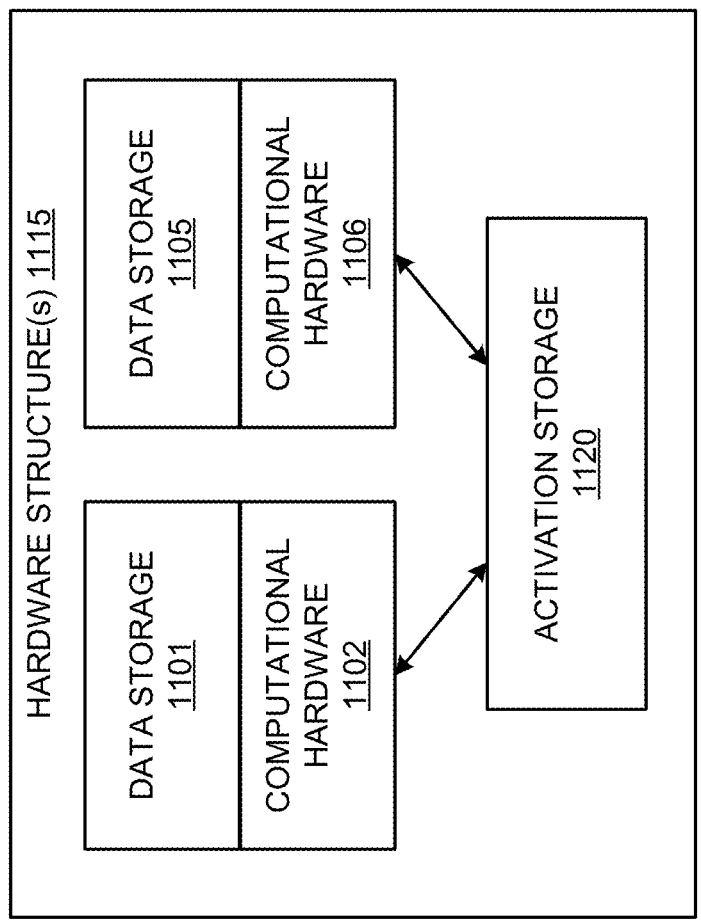
FIG. 11B illustrates inference and/or training logic, according to at least one embodiment.

FIG. 11B illustrates inference and/or training logic 1115, according to at least one or more embodiments. In at least one embodiment, inference and/or training logic 1115 may include, without limitation, hardware logic in which computational resources are dedicated or otherwise exclusively used in conjunction with weight values or other information corresponding to one or more layers of neurons within a neural network. In at least one embodiment, inference and/or training logic 1115 illustrated in FIG. 11B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1115 illustrated in FIG. 11B may be used in conjunction with central processing unit (CPU) hardware, graphics processing unit (GPU) hardware or other hardware, such as field programmable gate arrays (FPGAs). In at least one embodiment, inference and/or training logic 1115 includes, without limitation, code and/or data storage 1101 and code and/or data storage 1105, which may be used to store code (e.g., graph code), weight values and/or other information, including bias values, gradient information, momentum values, and/or other parameter or hyperparameter information. In at least one embodiment illustrated in FIG. 11B, each of code and/or data storage 1101 and code and/or data storage 1105 is associated with a dedicated computational resource, such as computational hardware 1102 and computational hardware 1106, respectively. In at least one embodiment, each of computational hardware 1102 and computational hardware 1106 comprises one or more ALUs that perform mathematical functions, such as linear algebraic functions, only on information stored in code and/or data storage 1101 and code and/or data storage 1105, respectively, result of which is stored in activation storage 1120.

In at least one embodiment, each of code and/or data storage 1101 and 1105 and corresponding computational hardware 1102 and 1106, respectively, correspond to different layers of a neural network, such that resulting activation from one "storage/computational pair 1101/1102" of code and/or data storage 1101 and computational hardware 1102 is provided as an input to "storage/computational pair 1105/1106" of code and/or data storage 1105 and computational hardware 1106, in order to mirror conceptual organization of a neural network. In at least one embodiment, each of storage/computational pairs 1101/1102 and 1105/1106 may correspond to more than one neural network layer. In at least one embodiment, additional storage/computation pairs (not shown) subsequent to or in parallel with storage computation pairs 1101/1102 and 1105/1106 may be included in inference and/or training logic 1115.

Data Center

Figure 12:
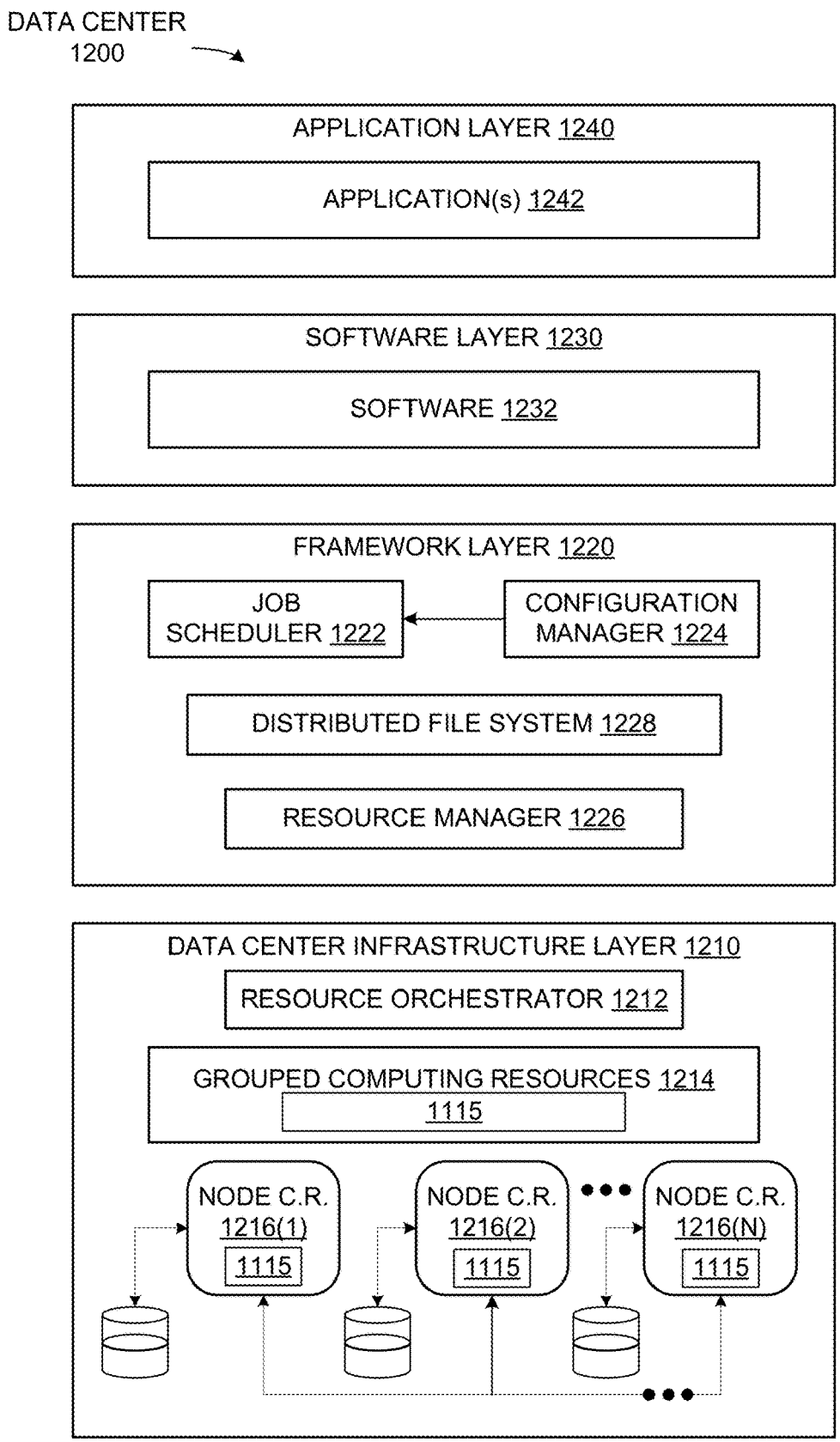
FIG. 12 illustrates an example data center system, according to at least one embodiment.

FIG. 12 illustrates an example data center 1200, in which at least one embodiment may be used. In at least one embodiment, data center 1200 includes a data center infrastructure layer 1210, a framework layer 1220, a software layer 1230, and an application layer 1240.

In at least one embodiment, as shown in FIG. 12, data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1216(1)-1216(N) may be a server having one or more of above-mentioned computing resources.

In at least one embodiment, grouped computing resources 1214 may include separate groupings of node C.R.s housed within one or more racks (not shown), or many racks housed in data centers at various geographical locations (also not shown). Separate groupings of node C.R.s within grouped computing resources 1214 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1212 may configure or otherwise control one or more node C.R.s 1216(1)-1216(N) and/or grouped computing resources 1214. In at least one embodiment, resource orchestrator 1212 may include a software design infrastructure ("SDI") management entity for data center 1200. In at least one embodiment, resource orchestrator may include hardware, software or some combination thereof.

In at least one embodiment, as shown in FIG. 12, framework layer 1220 includes a job scheduler 1222, a configuration manager 1224, a resource manager 1226 and a distributed file system 1228. In at least one embodiment, framework layer 1220 may include a framework to support software 1232 of software layer 1230 and/or one or more application(s) 1242 of application layer 1240. In at least one embodiment, software 1232 or application(s) 1242 may respectively include web-based service software or applications, such as those provided by Amazon Web Services, Google Cloud and Microsoft Azure. In at least one embodiment, framework layer 1220 may be, but is not limited to, a type of free and open-source software web application framework such as Apache Spark™ (hereinafter "Spark") that may utilize distributed file system 1228 for large-scale data processing (e.g., "big data"). In at least one embodiment, job scheduler 1222 may include a Spark driver to facilitate scheduling of workloads supported by various layers of data center 1200. In at least one embodiment, configuration manager 1224 may be capable of configuring different layers such as software layer 1230 and framework layer 1220 including Spark and distributed file system 1228 for supporting large-scale data processing. In at least one embodiment, resource manager 1226 may be capable of managing clustered or grouped computing resources mapped to or allocated for support of distributed file system 1228 and job scheduler 1222. In at least one embodiment, clustered or grouped computing resources may include grouped computing resource 1214 at data center infrastructure layer 1210. In at least one embodiment, resource manager 1226 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1228 of framework layer 1220. one or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216(1)-1216(N), grouped computing resources 1214, and/or distributed file system 1228 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1224, resource manager 1226, and resource orchestrator 1212 may implement any number and type of self-modifying actions based on any amount and type of data acquired in any technically feasible fashion. In at least one embodiment, self-modifying actions may relieve a data center operator of data center 1200 from making possibly bad configuration decisions and possibly avoiding underutilized and/or poor performing portions of a data center.

In at least one embodiment, data center 1200 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1200. In at least one embodiment, trained machine learning models corresponding to one or more neural networks may be used to infer or predict information using resources described above with respect to data center 1200 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1115 are used to perform inferencing and/or training operations associated with one or more embodiments. Details regarding inference and/or one embodiment, inference and/or training logic 1115 may be used in system FIG. 12 for inferencing or predicting operations based, at least in part, on weight parameters calculated using neural network training operations, neural network functions and/or architectures, or neural network use cases described herein.

Such components can be used to perform classification or segmentation of one or more objects represented in image data in at least one embodiment. This can include using a shape stream in parallel with a primary image analysis stream in order to force the primary stream to consider shape information for the object(s).

Computer Systems

Figure 13:
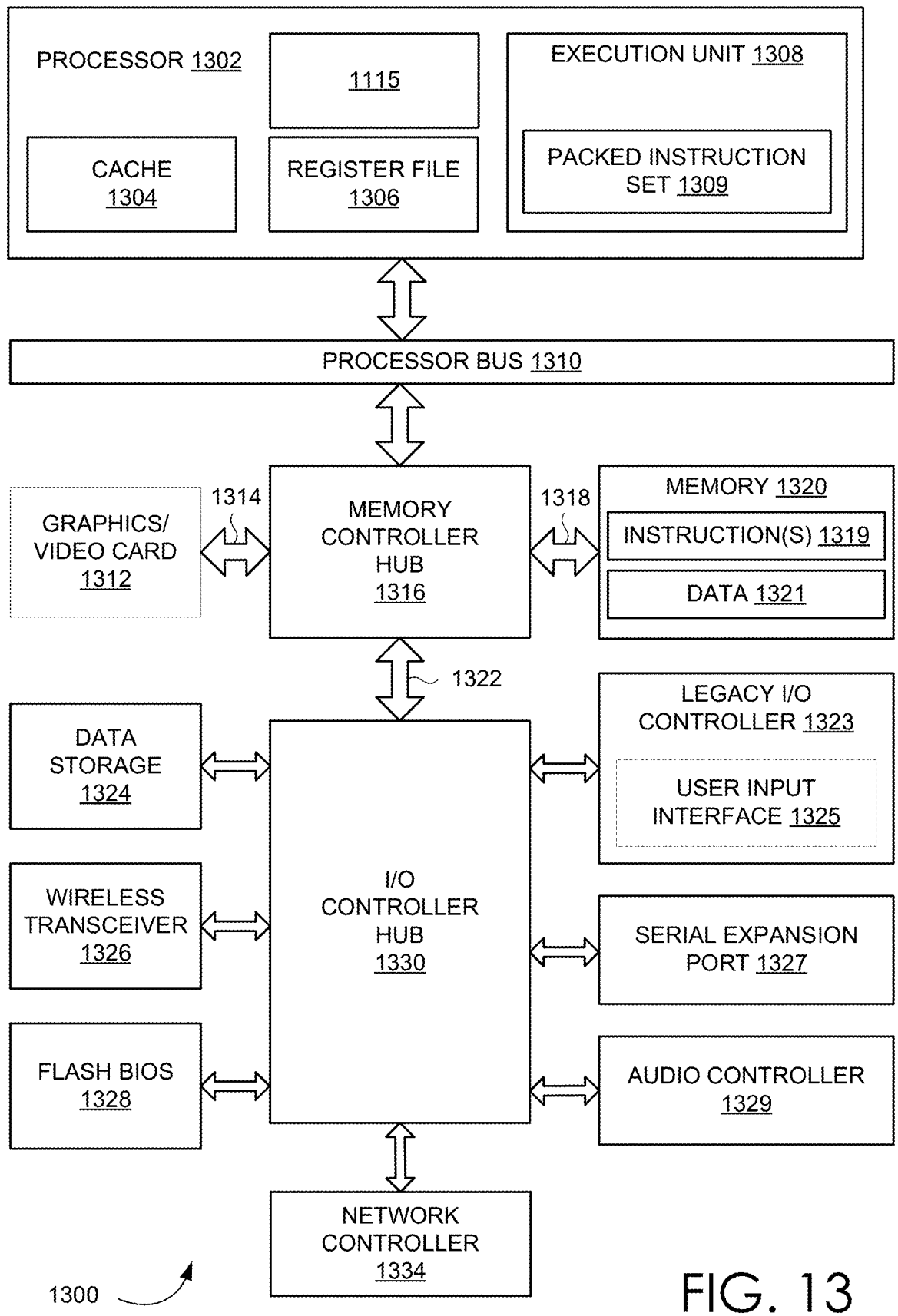
FIG. 13 illustrates a computer system, according to at least one embodiment.

FIG. 13 is a block diagram illustrating an exemplary computer system, which may be a system with interconnected devices and components, a system-on-a-chip (SOC) or some combination thereof 1300 formed with a processor that may include execution units to execute an instruction, according to at least one embodiment. In at least one embodiment, computer system 1300 may include, without limitation, a component, such as a processor 1302 to employ execution units including logic to perform algorithms for process data, in accordance with present disclosure, such as in embodiment described herein. In at least one embodiment, computer system 1300 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1300 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1300 may include, without limitation, processor 1302 that may include, without limitation, one or more execution units 1308 to perform machine learning model training and/or inferencing according to techniques described herein. In at least one embodiment, computer system 1300 is a single processor desktop or server system, but in another embodiment computer system 1300 may be a multiprocessor system. In at least one embodiment, processor 1302 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1302 may be coupled to a processor bus 1310 that may transmit data signals between processor 1302 and other components in computer system 1300.

In at least one embodiment, processor 1302 may include, without limitation, a Level 1 ("L1") internal cache memory ("cache") 1304. In at least one embodiment, processor 1302 may have a single internal cache or multiple levels of internal cache. In at least one embodiment, cache memory may reside external to processor 1302. Other embodiments may also include a combination of both internal and external caches depending on particular implementation and needs. In at least one embodiment, register file 1306 may store different types of data in various registers including, without limitation, integer registers, floating point registers, status registers, and instruction pointer register.

In at least one embodiment, execution unit 1308, including, without limitation, logic to perform integer and floating point operations, also resides in processor 1302. In at least one embodiment, processor 1302 may also include a microcode ("ucode") read only memory ("ROM") that stores microcode for certain macro instructions. In at least one embodiment, execution unit 1308 may include logic to handle a packed instruction set 1309. In at least one embodiment, by including packed instruction set 1309 in an instruction set of a general-purpose processor 1302, along with associated circuitry to execute instructions, operations used by many multimedia applications may be performed using packed data in a general-purpose processor 1302. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1308 may also be used in microcontrollers, embedded processors, graphics devices, DSPs, and other types of logic circuits. In at least one embodiment, computer system 1300 may include, without limitation, a memory 1320. In at least one embodiment, memory 1320 may be implemented as a Dynamic Random Access Memory ("DRAM") device, a Static Random Access Memory ("SRAM") device, flash memory device, or other memory device. In at least one embodiment, memory 1320 may store instruction(s) 1319 and/or data 1321 represented by data signals that may be executed by processor 1302.

In at least one embodiment, system logic chip may be coupled to processor bus 1310 and memory 1320. In at least one embodiment, system logic chip may include, without limitation, a memory controller hub ("MCH") 1316, and processor 1302 may communicate with MCH 1316 via processor bus 1310. In at least one embodiment, MCH 1316 may provide a high bandwidth memory path 1318 to memory 1320 for instruction and data storage and for storage of graphics commands, data and textures. In at least one embodiment, MCH 1316 may direct data signals between processor 1302, memory 1320, and other components in computer system 1300 and to bridge data signals between processor bus 1310, memory 1320, and a system I/O 1322. In at least one embodiment, system logic chip may provide a graphics port for coupling to a graphics controller. In at least one embodiment, MCH 1316 may be coupled to memory 1320 through a high bandwidth memory path 1318 and graphics/video card 1312 may be coupled to MCH 1316 through an Accelerated Graphics Port ("AGP") interconnect 1314.

In at least one embodiment, computer system 1300 may use system I/O 1322 that is a proprietary hub interface bus to couple MCH 1316 to I/O controller hub ("ICH") 1330. In at least one embodiment, ICH 1330 may provide direct connections to some I/O devices via a local I/O bus. In at least one embodiment, local I/O bus may include, without limitation, a high-speed I/O bus for connecting peripherals to memory 1320, chipset, and processor 1302. Examples may include, without limitation, an audio controller 1329, a firmware hub ("flash BIOS") 1328, a wireless transceiver 1326, a data storage 1324, a legacy I/O controller 1323 containing user input and keyboard interfaces 1325, a serial expansion port 1327, such as Universal Serial Bus ("USB"), and a network controller 1334. data storage 1324 may comprise a hard disk drive, a floppy disk drive, a CD-ROM device, a flash memory device, or other mass storage device.

In at least one embodiment, FIG. 13A illustrates a system, which includes interconnected hardware devices or "chips", whereas in other embodiments, FIG. 13A may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1300 are interconnected using compute express link (CXL) interconnects.

Inference and/or training logic 1115 are used to perform inferencing and/or training operations associated with one or more embodiments. Details regarding inference and/or training logic 1115 are provided below in conjunction with FIGS. 11A and/or 11B. In at least one embodiment, inference and/or training logic 1115 may be used in system FIG. 13A for inferencing or predicting operations based, at least in part, on weight parameters calculated using neural network training operations, neural network functions and/or architectures, or neural network use cases described herein.

Such components can be used to perform classification or segmentation of one or more objects represented in image data in at least one embodiment. This can include using a shape stream in parallel with a primary image analysis stream in order to force the primary stream to consider shape information for the object(s).

Figure 14:
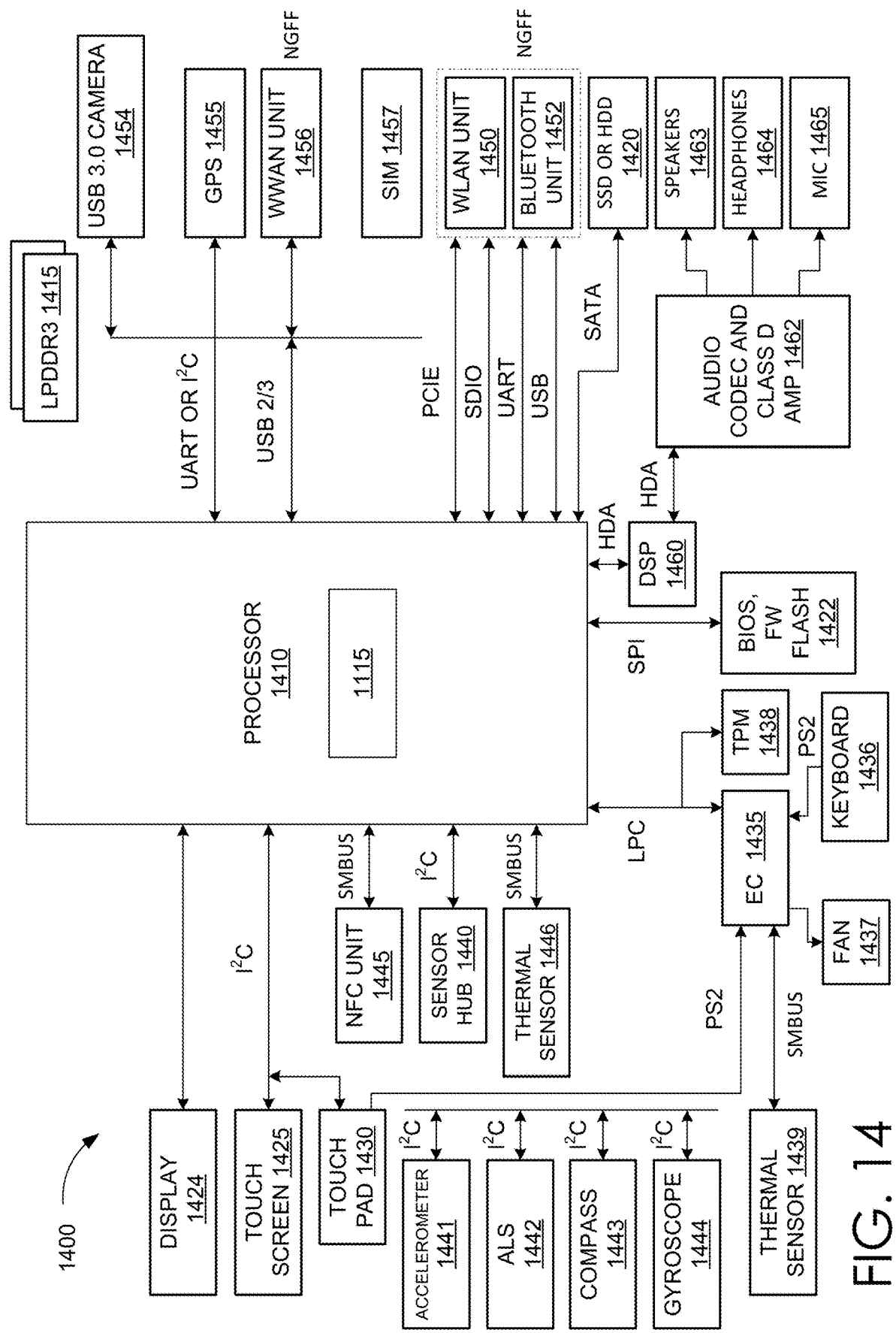
FIG. 14 illustrates a computer system, according to at least one embodiment.

FIG. 14 is a block diagram illustrating an electronic device 1400 for utilizing a processor 1410, according to at least one embodiment. In at least one embodiment, electronic device 1400 may be, for example and without limitation, a notebook, a tower server, a rack server, a blade server, a laptop, a desktop, a tablet, a mobile device, a phone, an embedded computer, or any other suitable electronic device.

In at least one embodiment, system 1400 may include, without limitation, processor 1410 communicatively coupled to any suitable number or kind of components, peripherals, modules, or devices. In at least one embodiment, processor 1410 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 14 illustrates a system, which includes interconnected hardware devices or "chips", whereas in other embodiments, FIG. 14 may illustrate an exemplary System on a Chip ("SoC"). In at least one embodiment, devices illustrated in FIG. 14 may be interconnected with proprietary interconnects, standardized interconnects (e.g., PCIe) or some combination thereof. In at least one embodiment, one or more components of FIG. 14 are interconnected using compute express link (CXL) interconnects.

In at least one embodiment, FIG. 14 may include a display 1424, a touch screen 1425, a touch pad 1430, a Near Field Communications unit ("NFC") 1445, a sensor hub 1440, a thermal sensor 1446, an Express Chipset ("EC") 1435, a Trusted Platform Module ("TPM") 1438, BIOS/firmware/flash memory ("BIOS, FW Flash") 1422, a DSP 1460, a drive 1420 such as a Solid State Disk ("SSD") or a Hard Disk Drive ("HDD"), a wireless local area network unit ("WLAN") 1450, a Bluetooth unit 1452, a Wireless Wide Area Network unit ("WWAN") 1456, a Global Positioning System (GPS) 1455, a camera ("USB 3.0 camera") 1454 such as a USB 3.0 camera, and/or a Low Power Double Data Rate ("LPDDR") memory unit ("LPDDR3") 1415 implemented in, for example, LPDDR3 standard. These components may each be implemented in any suitable manner.

In at least one embodiment, other components may be communicatively coupled to processor 1410 through components discussed above. In at least one embodiment, an accelerometer 1441, Ambient Light Sensor ("ALS") 1442, compass 1443, and a gyroscope 1444 may be communicatively coupled to sensor hub 1440. In at least one embodiment, thermal sensor 1439, a fan 1437, a keyboard 1446, and a touch pad 1430 may be communicatively coupled to EC 1435. In at least one embodiment, speaker 1463, headphones 1464, and microphone ("mic") 1465 may be communicatively coupled to an audio unit ("audio codec and class d amp") 1462, which may in turn be communicatively coupled to DSP 1460. In at least one embodiment, audio unit 1464 may include, for example and without limitation, an audio coder/decoder ("codec") and a class D amplifier. In at least one embodiment, SIM card ("SIM") 1457 may be communicatively coupled to WWAN unit 1456. In at least one embodiment, components such as WLAN unit 1450 and Bluetooth unit 1452, as well as WWAN unit 1456 may be implemented in a Next Generation Form Factor ("NGFF").

Inference and/or training logic 1115 are used to perform inferencing and/or training operations associated with one or more embodiments. Details regarding inference and/or training logic 1115 are provided below in conjunction with FIGS. 11A and/or 11B. In at least one embodiment, inference and/or training logic 1115 may be used in system FIG. 14 for inferencing or predicting operations based, at least in part, on weight parameters calculated using neural network training operations, neural network functions and/or architectures, or neural network use cases described herein.

Such components can be used to perform classification or segmentation of one or more objects represented in image data in at least one embodiment. This can include using a shape stream in parallel with a primary image analysis stream in order to force the primary stream to consider shape information for the object(s).

Figure 15:
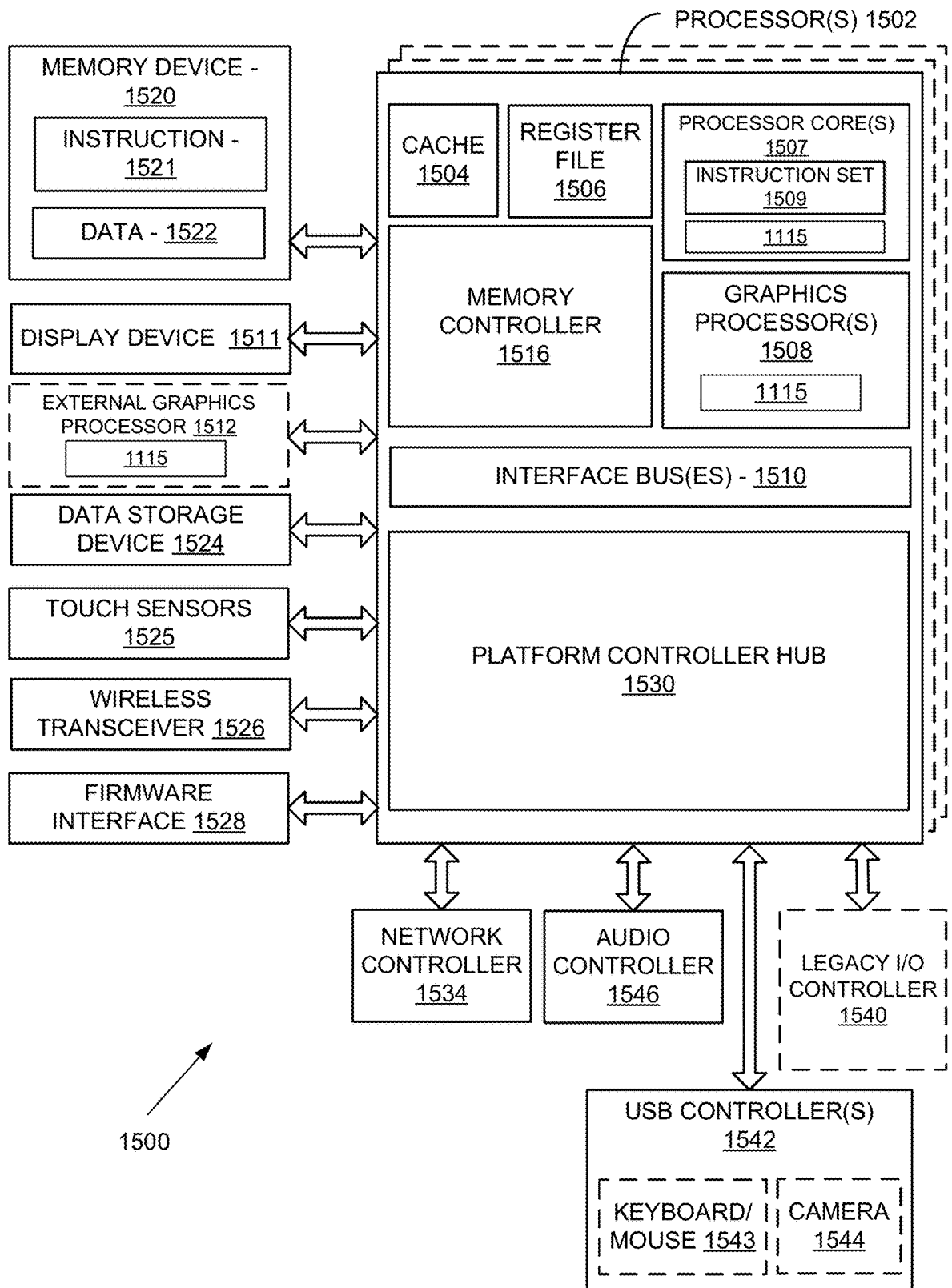
FIGS. 15 and 16 illustrate at least portions of a graphics processor, according to one or more embodiments.

FIG. 15 is a block diagram of a processing system, according to at least one embodiment. In at least one embodiment, system 1500 includes one or more processors 1502 and one or more graphics processors 1508, and may be a single processor desktop system, a multiprocessor workstation system, or a server system having a large number of processors 1502 or processor cores 1507. In at least one embodiment, system 1500 is a processing platform incorporated within a system-on-a-chip (SoC) integrated circuit for use in mobile, handheld, or embedded devices.

In at least one embodiment, system 1500 can include, or be incorporated within a server-based gaming platform, a game console, including a game and media console, a mobile gaming console, a handheld game console, or an online game console. In at least one embodiment, system 1500 is a mobile phone, smart phone, tablet computing device or mobile Internet device. In at least one embodiment, processing system 1500 can also include, couple with, or be integrated within a wearable device, such as a smart watch wearable device, smart eyewear device, augmented reality device, or virtual reality device. In at least one embodiment, processing system 1500 is a television or set top box device having one or more processors 1502 and a graphical interface generated by one or more graphics processors 1508.

In at least one embodiment, one or more processors 1502 each include one or more processor cores 1507 to process instructions which, when executed, perform operations for system and user software. In at least one embodiment, each of one or more processor cores 1507 is configured to process a specific instruction set 1509. In at least one embodiment, instruction set 1509 may facilitate Complex Instruction Set Computing (CISC), Reduced Instruction Set Computing (RISC), or computing via a Very Long Instruction Word (VLIW). In at least one embodiment, processor cores 1507 may each process a different instruction set 1509, which may include instructions to facilitate emulation of other instruction sets. In at least one embodiment, processor core 1507 may also include other processing devices, such a Digital Signal Processor (DSP).

In at least one embodiment, processor 1502 includes cache memory 1504. In at least one embodiment, processor 1502 can have a single internal cache or multiple levels of internal cache. In at least one embodiment, cache memory is shared among various components of processor 1502. In at least one embodiment, processor 1502 also uses an external cache (e.g., a Level-3 (L3) cache or Last Level Cache (LLC)) (not shown), which may be shared among processor cores 1507 using known cache coherency techniques. In at least one embodiment, register file 1506 is additionally included in processor 1502 which may include different types of registers for storing different types of data (e.g., integer registers, floating point registers, status registers, and an instruction pointer register). In at least one embodiment, register file 1506 may include general-purpose registers or other registers.

In at least one embodiment, one or more processor(s) 1502 are coupled with one or more interface bus(es) 1510 to transmit communication signals such as address, data, or control signals between processor 1502 and other components in system 1500. In at least one embodiment, interface bus 1510, in one embodiment, can be a processor bus, such as a version of a Direct Media Interface (DMI) bus. In at least one embodiment, interface 1510 is not limited to a DMI bus, and may include one or more Peripheral Component Interconnect buses (e.g., PCI, PCI Express), memory busses, or other types of interface busses. In at least one embodiment processor(s) 1502 include an integrated memory controller 1516 and a platform controller hub 1530. In at least one embodiment, memory controller 1516 facilitates communication between a memory device and other components of system 1500, while platform controller hub (PCH) 1530 provides connections to I/O devices via a local I/O bus.

In at least one embodiment, memory device 1520 can be a dynamic random access memory (DRAM) device, a static random access memory (SRAM) device, flash memory device, phase-change memory device, or some other memory device having suitable performance to serve as process memory. In at least one embodiment memory device 1520 can operate as system memory for system 1500, to store data 1522 and instructions 1521 for use when one or more processors 1502 executes an application or process. In at least one embodiment, memory controller 1516 also couples with an optional external graphics processor 1512, which may communicate with one or more graphics processors 1508 in processors 1502 to perform graphics and media operations. In at least one embodiment, a display device 1511 can connect to processor(s) 1502. In at least one embodiment display device 1511 can include one or more of an internal display device, as in a mobile electronic device or a laptop device or an external display device attached via a display interface (e.g., DisplayPort, etc.). In at least one embodiment, display device 1511 can include a head mounted display (HMD) such as a stereoscopic display device for use in virtual reality (VR) applications or augmented reality (AR) applications.

In at least one embodiment, platform controller hub 1530 enables peripherals to connect to memory device 1520 and processor 1502 via a high-speed I/O bus. In at least one embodiment, I/O peripherals include, but are not limited to, an audio controller 1546, a network controller 1534, a firmware interface 1528, a wireless transceiver 1526, touch sensors 1525, a data storage device 1524 (e.g., hard disk drive, flash memory, etc.). In at least one embodiment, data storage device 1524 can connect via a storage interface (e.g., SATA) or via a peripheral bus, such as a Peripheral Component Interconnect bus (e.g., PCI, PCI Express). In at least one embodiment, touch sensors 1525 can include touch screen sensors, pressure sensors, or fingerprint sensors. In at least one embodiment, wireless transceiver 1526 can be a Wi-Fi transceiver, a Bluetooth transceiver, or a mobile network transceiver such as a 3G, 4G, or Long Term Evolution (LTE) transceiver. In at least one embodiment, firmware interface 1528 enables communication with system firmware, and can be, for example, a unified extensible firmware interface (UEFI). In at least one embodiment, network controller 1534 can enable a network connection to a wired network. In at least one embodiment, a high-performance network controller (not shown) couples with interface bus 1510. In at least one embodiment, audio controller 1546 is a multi-channel high definition audio controller. In at least one embodiment, system 1500 includes an optional legacy I/O controller 1540 for coupling legacy (e.g., Personal System 2 (PS/2)) devices to system. In at least one embodiment, platform controller hub 1530 can also connect to one or more Universal Serial Bus (USB) controllers 1542 connect input devices, such as keyboard and mouse 1543 combinations, a camera 1544, or other USB input devices.

In at least one embodiment, an instance of memory controller 1516 and platform controller hub 1530 may be integrated into a discreet external graphics processor, such as external graphics processor 1512. In at least one embodiment, platform controller hub 1530 and/or memory controller 1516 may be external to one or more processor(s) 1502. For example, in at least one embodiment, system 1500 can include an external memory controller 1516 and platform controller hub 1530, which may be configured as a memory controller hub and peripheral controller hub within a system chipset that is in communication with processor(s) 1502.

Inference and/or training logic 1115 are used to perform inferencing and/or training operations associated with one or more embodiments. Details regarding inference and/or training logic 1115 are provided below in conjunction with FIGS. 11A and/or 11B. In at least one embodiment portions or all of inference and/or training logic 1115 may be incorporated into graphics processor 1500. For example, in at least one embodiment, training and/or inferencing techniques described herein may use one or more of ALUs embodied in graphics processor 1512. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of graphics processor 1500 to perform one or more machine learning algorithms, neural network architectures, use cases, or training techniques described herein.

Such components can be used to perform classification or segmentation of one or more objects represented in image data in at least one embodiment. This can include using a shape stream in parallel with a primary image analysis stream in order to force the primary stream to consider shape information for the object(s).

Figure 16:
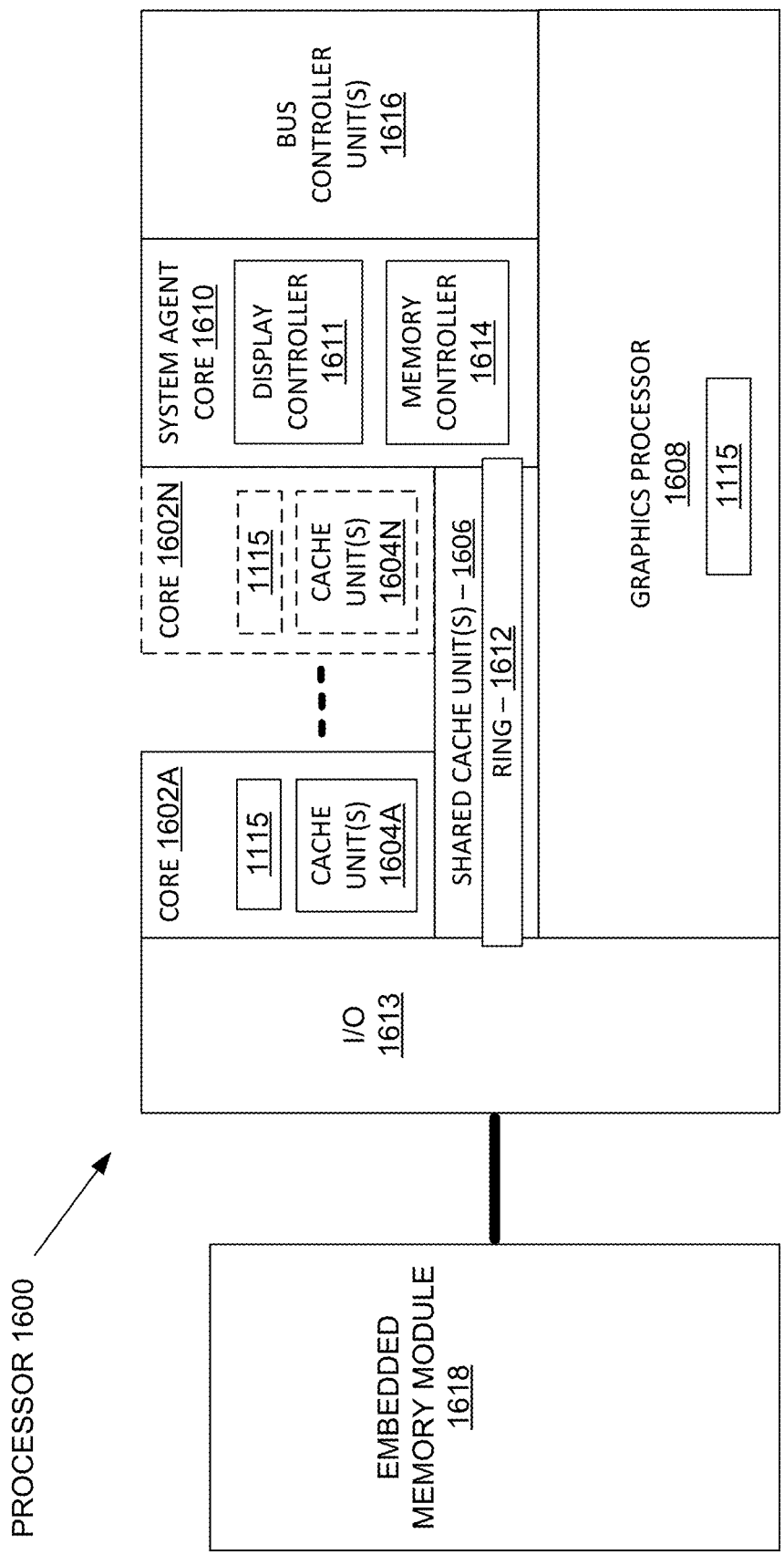

FIG. 16 is a block diagram of a processor 1600 having one or more processor cores 1602A-1602N, an integrated memory controller 1614, and an integrated graphics processor 1608, according to at least one embodiment. In at least one embodiment, processor 1600 can include additional cores up to and including additional core 1602N represented by dashed lined boxes. In at least one embodiment, each of processor cores 1602A-1602N includes one or more internal cache units 1604A-1604N. In at least one embodiment, each processor core also has access to one or more shared cached units 1606.

In at least one embodiment, internal cache units 1604A-1604N and shared cache units 1606 represent a cache memory hierarchy within processor 1600. In at least one embodiment, cache memory units 1604A-1604N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1606 and 1604A-1604N.

In at least one embodiment, processor 1600 may also include a set of one or more bus controller units 1616 and a system agent core 1610. In at least one embodiment, one or more bus controller units 1616 manage a set of peripheral buses, such as one or more PCI or PCI express busses. In at least one embodiment, system agent core 1610 provides management functionality for various processor components. In at least one embodiment, system agent core 1610 includes one or more integrated memory controllers 1614 to manage access to various external memory devices (not shown).

In at least one embodiment, one or more of processor cores 1602A-1602N include support for simultaneous multi-threading. In at least one embodiment, system agent core 1610 includes components for coordinating and operating cores 1602A-1602N during multi-threaded processing. In at least one embodiment, system agent core 1610 may additionally include a power control unit (PCU), which includes logic and components to regulate one or more power states of processor cores 1602A-1602N and graphics processor 1608.

In at least one embodiment, processor 1600 additionally includes graphics processor 1608 to execute graphics processing operations. In at least one embodiment, graphics processor 1608 couples with shared cache units 1606, and system agent core 1610, including one or more integrated memory controllers 1614. In at least one embodiment, system agent core 1610 also includes a display controller 1611 to drive graphics processor output to one or more coupled displays. In at least one embodiment, display controller 1611 may also be a separate module coupled with graphics processor 1608 via at least one interconnect, or may be integrated within graphics processor 1608.

In at least one embodiment, a ring based interconnect unit 1612 is used to couple internal components of processor 1600. In at least one embodiment, an alternative interconnect unit may be used, such as a point-to-point interconnect, a switched interconnect, or other techniques. In at least one embodiment, graphics processor 1608 couples with ring interconnect 1612 via an I/O link 1613.

In at least one embodiment, I/O link 1613 represents at least one of multiple varieties of I/O interconnects, including an on package I/O interconnect which facilitates communication between various processor components and a high-performance embedded memory module 1618, such as an eDRAM module. In at least one embodiment, each of processor cores 1602A-1602N and graphics processor 1608 use embedded memory modules 1618 as a shared Last Level Cache.

In at least one embodiment, processor cores 1602A-1602N are homogenous cores executing a common instruction set architecture. In at least one embodiment, processor cores 1602A-1602N are heterogeneous in terms of instruction set architecture (ISA), where one or more of processor cores 1602A-1602N execute a common instruction set, while one or more other cores of processor cores 1602A-16-02N executes a subset of a common instruction set or a different instruction set. In at least one embodiment, processor cores 1602A-1602N are heterogeneous in terms of microarchitecture, where one or more cores having a relatively higher power consumption couple with one or more power cores having a lower power consumption. In at least one embodiment, processor 1600 can be implemented on one or more chips or as an SoC integrated circuit.

Inference and/or training logic 1115 are used to perform inferencing and/or training operations associated with one or more embodiments. Details regarding inference and/or training logic 1115 are provided below in conjunction with FIGS. 11A and/or 11B. In at least one embodiment portions or all of inference and/or training logic 1115 may be incorporated into processor 1600. For example, in at least one embodiment, training and/or inferencing techniques described herein may use one or more of ALUs embodied in graphics processor 1512, graphics core(s) 1602A-1602N, or other components in FIG. 16. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of graphics processor 1600 to perform one or more machine learning algorithms, neural network architectures, use cases, or training techniques described herein.

Such components can be used to perform classification or segmentation of one or more objects represented in image data in at least one embodiment. This can include using a shape stream in parallel with a primary image analysis stream in order to force the primary stream to consider shape information for the object(s).

Autonomous Vehicle

Figure 17A:
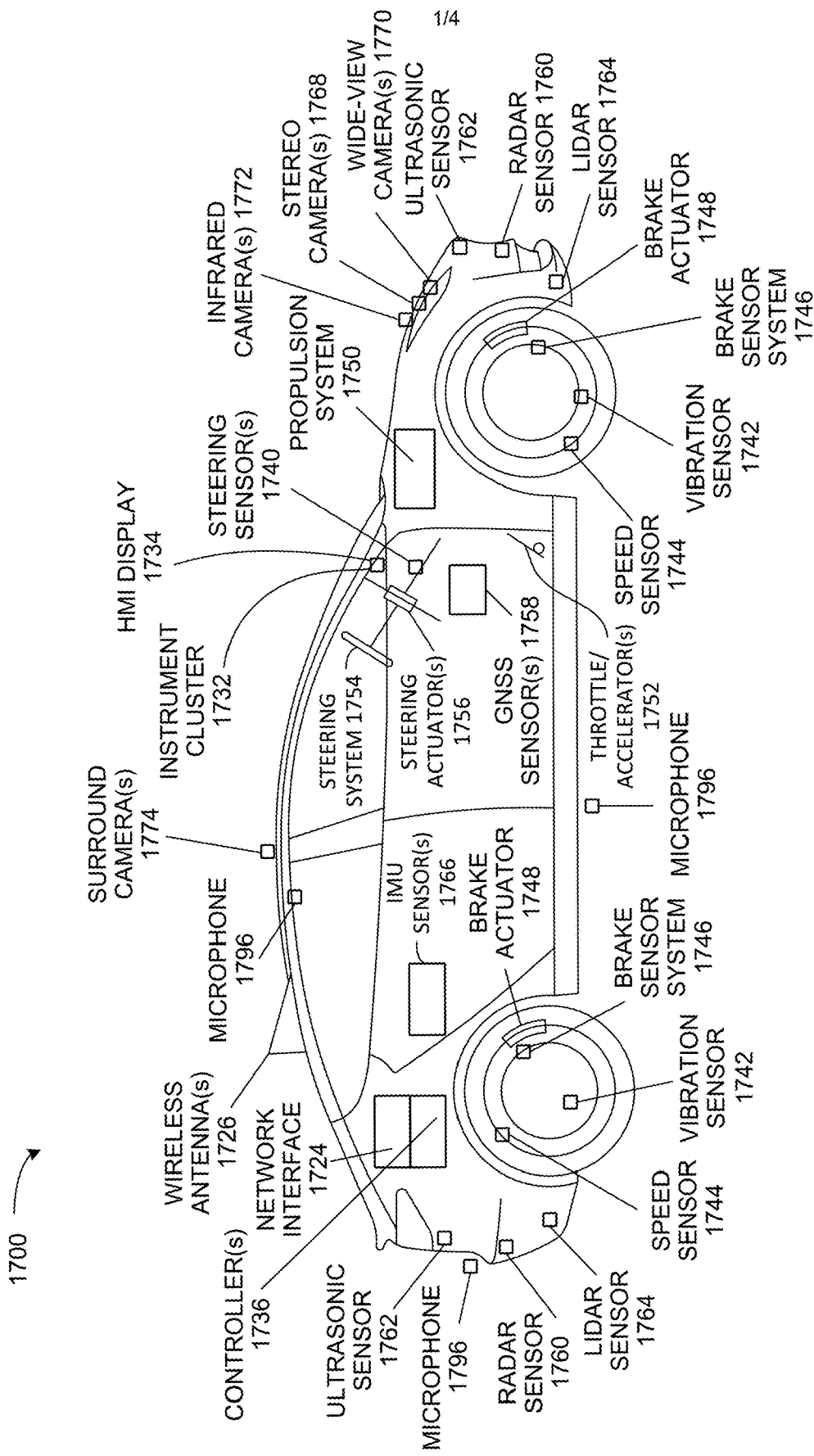
FIG. 17A illustrates an example of an autonomous vehicle, according to at least one embodiment.

FIG. 17A illustrates an example of an autonomous vehicle 1700, according to at least one embodiment. In at least one embodiment, autonomous vehicle 1700 (alternatively referred to herein as "vehicle 1700") may be, without limitation, a passenger vehicle, such as a car, a truck, a bus, and/or another type of vehicle that accommodates one or more passengers. In at least one embodiment, vehicle 1a00 may be a semi-tractor-trailer truck used for hauling cargo. In at least one embodiment, vehicle 1a00 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1700 may be capable of functionality in accordance with one or more of level 1-level 5 of autonomous driving levels. For example, in at least one embodiment, vehicle 1700 may be capable of conditional automation (Level 3), high automation (Level 4), and/or full automation (Level 5), depending on embodiment.

In at least one embodiment, vehicle 1700 may include, without limitation, components such as a chassis, a vehicle body, wheels (e.g., 2, 4, 6, 8, 18, etc.), tires, axles, and other components of a vehicle. In at least one embodiment, vehicle 1700 may include, without limitation, a propulsion system 1750, such as an internal combustion engine, hybrid electric power plant, an all-electric engine, and/or another propulsion system type. In at least one embodiment, propulsion system 1750 may be connected to a drive train of vehicle 1700, which may include, without limitation, a transmission, to enable propulsion of vehicle 1700. In at least one embodiment, propulsion system 1750 may be controlled in response to receiving signals from a throttle/accelerator(s) 1752.

In at least one embodiment, a steering system 1754, which may include, without limitation, a steering wheel, is used to steer a vehicle 1700 (e.g., along a desired path or route) when a propulsion system 1750 is operating (e.g., when vehicle is in motion). In at least one embodiment, a steering system 1754 may receive signals from steering actuator(s) 1756. A steering wheel may be optional for full automation (Level 5) functionality. In at least one embodiment, a brake sensor system 1746 may be used to operate vehicle brakes in response to receiving signals from brake actuator(s) 1748 and/or brake sensors.

In at least one embodiment, controller(s) 1736, which may include, without limitation, one or more system on chips ("SoCs") (not shown in FIG. 17A) and/or graphics processing unit(s) ("GPU(s)"), provide signals (e.g., representative of commands) to one or more components and/or systems of vehicle 1700. For instance, in at least one embodiment, controller(s) 1736 may send signals to operate vehicle brakes via brake actuator(s) 1748, to operate steering system 1754 via steering actuator(s) 1756, and/or to operate propulsion system 1750 via throttle/accelerator(s) 1752. Controller(s) 1736 may include one or more onboard (e.g., integrated) computing devices (e.g., supercomputers) that process sensor signals, and output operation commands (e.g., signals representing commands) to enable autonomous driving and/or to assist a human driver in driving vehicle 1700. In at least one embodiment, controller(s) 1736 may include a first controller 1736 for autonomous driving functions, a second controller 1736 for functional safety functions, a third controller 1736 for artificial intelligence functionality (e.g., computer vision), a fourth controller 1736 for infotainment functionality, a fifth controller 1736 for redundancy in emergency conditions, and/or other controllers. In at least one embodiment, a single controller 1736 may handle two or more of above functionalities, two or more controllers 1736 may handle a single functionality, and/or any combination thereof.

In at least one embodiment, controller(s) 1736 provide signals for controlling one or more components and/or systems of vehicle 1700 in response to sensor data received from one or more sensors (e.g., sensor inputs). In at least one embodiment, sensor data may be received from, for example and without limitation, global navigation satellite systems ("GNSS") sensor(s) 1758 (e.g., Global Positioning System sensor(s)), RADAR sensor(s) 1760, ultrasonic sensor(s) 1762, LIDAR sensor(s) 1764, inertial measurement unit ("IMU") sensor(s) 1766 (e.g., accelerometer(s), gyroscope(s), magnetic compass(es), magnetometer(s), etc.), microphone(s) 1796, stereo camera(s) 1768, wide-view camera(s) 1770 (e.g., fisheye cameras), infrared camera(s) 1772, surround camera(s) 1774 (e.g., 360 degree cameras), long-range cameras (not shown in FIG. 17A), mid-range camera(s) (not shown in FIG. 17A), speed sensor(s) 1744 (e.g., for measuring speed of vehicle 1700), vibration sensor(s) 1742, steering sensor(s) 1740, brake sensor(s) (e.g., as part of brake sensor system 1746), and/or other sensor types.

In at least one embodiment, one or more of controller(s) 1736 may receive inputs (e.g., represented by input data) from an instrument cluster 1732 of vehicle 1700 and provide outputs (e.g., represented by output data, display data, etc.) via a human-machine interface ("HMI") display 1734, an audible annunciator, a loudspeaker, and/or via other components of vehicle 1700. In at least one embodiment, outputs may include information such as vehicle velocity, speed, time, map data (e.g., a High Definition map (not shown in FIG. 17A), location data (e.g., vehicle 1700's location, such as on a map), direction, location of other vehicles (e.g., an occupancy grid), information about objects and status of objects as perceived by controller(s) 1736, etc. For example, in at least one embodiment, HMI display 1734 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1700 further includes a network interface 1724 which may use wireless antenna(s) 1726 and/or modem(s) to communicate over one or more networks. For example, in at least one embodiment, network interface 1724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1726 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1115 are used to perform inferencing and/or training operations associated with one or more embodiments. Details regarding inference and/or training logic 1115 are provided below in conjunction with FIGS. 11A and/or 11B. In at least one embodiment, inference and/or training logic 1115 may be used in system FIG. 17A for inferencing or predicting operations based, at least in part, on weight parameters calculated using neural network training operations, neural network functions and/or architectures, or neural network use cases described herein.

Such components can be used to perform classification or segmentation of one or more objects represented in image data in at least one embodiment. This can include using a shape stream in parallel with a primary image analysis stream in order to force the primary stream to consider shape information for the object(s).

Referring back to FIG. 1, an example of camera locations and fields of view for autonomous vehicle 1700 of FIG. 17A is illustrated, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1700.

In at least one embodiment, camera types for cameras may include, but are not limited to, digital cameras that may be adapted for use with components and/or systems of vehicle 1700. In at least one embodiment, one or more of camera(s) may operate at automotive safety integrity level ("ASIL") B and/or at another ASIL. In at least one embodiment, camera types may be capable of any image capture rate, such as 60 frames per second (fps), 120 fps, 240 fps, etc., depending on embodiment. In at least one embodiment, cameras may be capable of using rolling shutters, global shutters, another type of shutter, or a combination thereof. In at least one embodiment, color filter array may include a red clear ("RCCC") color filter array, a red clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cab In at least one embodiment.

In at least one embodiment, cameras with a field of view that include portions of environment in front of vehicle 1700 (e.g., front-facing cameras) may be used for surround view, to help identify forward facing paths and obstacles, as well as aid in, with help of one or more of controllers 1736 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1770 may be used to perceive objects coming into view from periphery (e.g., pedestrians, crossing traffic or bicycles). Although only one wide-view camera 1770 is illustrated in FIG. 1, in other embodiments, there may be any number (including zero) of wide-view camera(s) 1770 on vehicle 1700. In at least one embodiment, any number of long-range camera(s) 1798 (e.g., a long-view stereo camera pair) may be used for depth-based object detection, especially for objects for which a neural network has not yet been trained. In at least one embodiment, long-range camera(s) 1798 may also be used for object detection and classification, as well as basic object tracking.

In at least one embodiment, any number of stereo camera(s) 1768 may also be included in a front-facing configuration. In at least one embodiment, one or more of stereo camera(s) 1768 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1700, including a distance estimate for all points in image. In at least one embodiment, one or more of stereo camera(s) 1768 may include, without limitation, compact stereo vision sensor(s) that may include, without limitation, two camera lenses (one each on left and right) and an image processing chip that may measure distance from vehicle 1700 to target object and use generated information (e.g., metadata) to activate autonomous emergency braking and lane departure warning functions. In at least one embodiment, other types of stereo camera(s) 1768 may be used in addition to, or alternatively from, those described herein.

In at least one embodiment, cameras with a field of view that include portions of environment to side of vehicle 1700 (e.g., side-view cameras) may be used for surround view, providing information used to create and update occupancy grid, as well as to generate side impact collision warnings. For example, in at least one embodiment, surround camera(s) 1774 (e.g., four surround cameras 1774 as illustrated in FIG. 1) could be positioned on vehicle 1700. In at least one embodiment, surround camera(s) 1774 may include, without limitation, any number and combination of wide-view camera(s) 1770, fisheye camera(s), 360 degree camera(s), and/or like. For instance, in at least one embodiment, four fisheye cameras may be positioned on front, rear, and sides of vehicle 1700. In at least one embodiment, vehicle 1700 may use three surround camera(s) 1774 (e.g., left, right, and rear), and may leverage one or more other camera(s) (e.g., a forward-facing camera) as a fourth surround-view camera.

In at least one embodiment, cameras with a field of view that include portions of environment to rear of vehicle 1700 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1798 and/or mid-range camera(s) 1776, stereo camera(s) 1768), infrared camera(s) 1772, etc.), as described herein.

Inference and/or training logic 1115 are used to perform inferencing and/or training operations associated with one or more embodiments. Details regarding inference and/or one embodiment, inference and/or training logic 1115 may be used in system FIG. 1 for inferencing or predicting operations based, at least in part, on weight parameters calculated using neural network training operations, neural network functions and/or architectures, or neural network use cases described herein.

Such components can be used to perform classification or segmentation of one or more objects represented in image data in at least one embodiment. This can include using a shape stream in parallel with a primary image analysis stream in order to force the primary stream to consider shape information for the object(s).

Figure 17B:
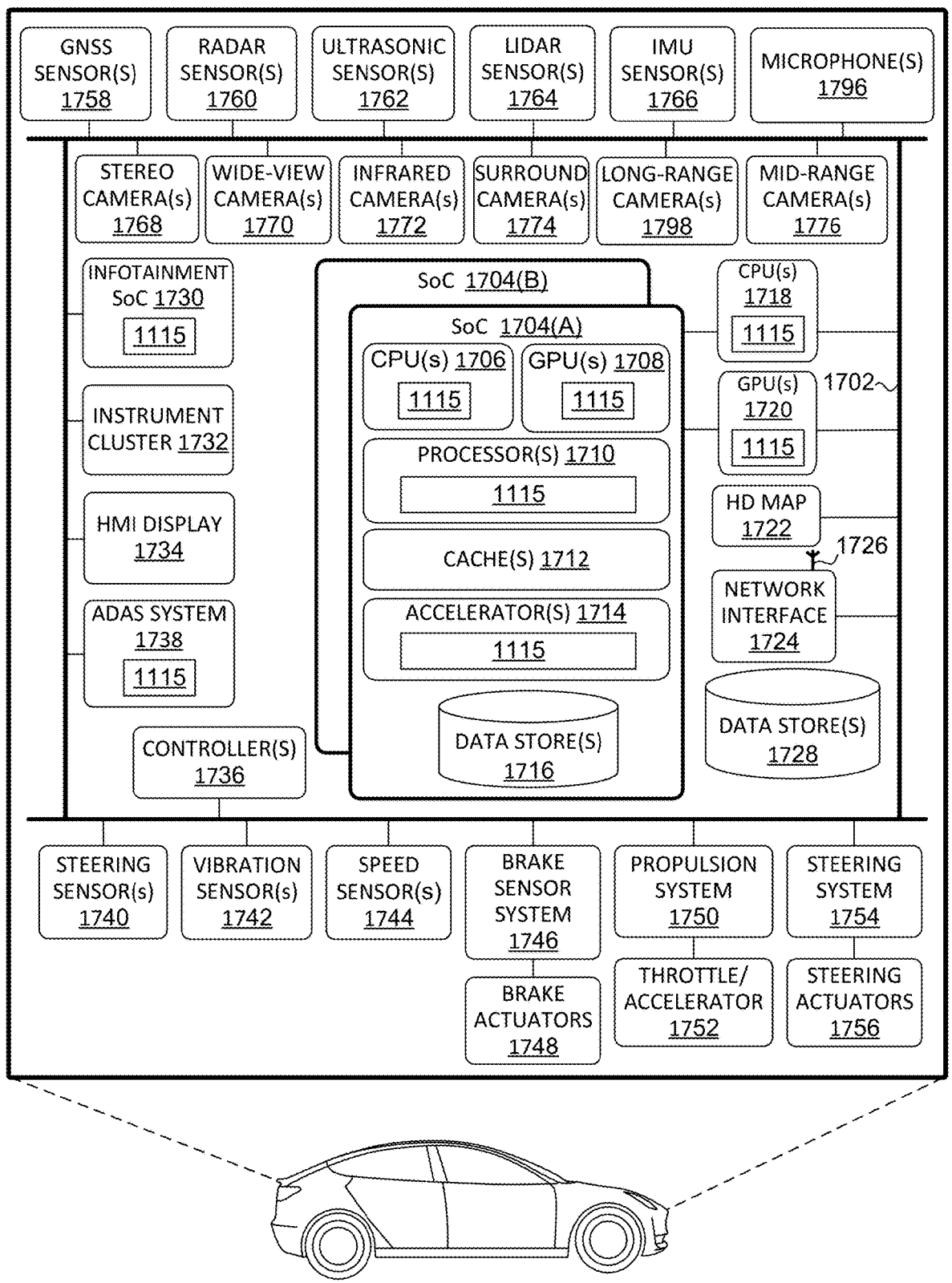
FIG. 17B illustrates an example system architecture for the autonomous vehicle of FIG. 17A, according to at least one embodiment.

FIG. 17B is a block diagram illustrating an example system architecture for autonomous vehicle 1700 of FIG. 17A, according to at least one embodiment. In at least one embodiment, each of components, features, and systems of vehicle 1700 in FIG. 17B are illustrated as being connected via a bus 1702. In at least one embodiment, bus 1702 may include, without limitation, a CAN data interface (alternatively referred to herein as a "CAN bus"). In at least one embodiment, a CAN bus may be a network inside vehicle 1700 used to aid in control of various features and functionality of vehicle 1700, such as actuation of brakes, acceleration, braking, steering, windshield wipers, etc. In at least one embodiment, bus 1702 may be configured to have dozens or even hundreds of nodes, each with its own unique identifier (e.g., a CAN ID). In at least one embodiment, bus 1702 may be read to find steering wheel angle, ground speed, engine revolutions per minute ("RPMs"), button positions, and/or other vehicle status indicators. In at least one embodiment, bus 1702 may be a CAN bus that is ASIL B compliant.

In at least one embodiment, in addition to, or alternatively from CAN, FlexRay and/or Ethernet may be used. In at least one embodiment, there may be any number of busses 1702, which may include, without limitation, zero or more CAN busses, zero or more FlexRay busses, zero or more Ethernet busses, and/or zero or more other types of busses using a different protocol. In at least one embodiment, two or more busses 1702 may be used to perform different functions, and/or may be used for redundancy. For example, a first bus 1702 may be used for collision avoidance functionality and a second bus 1702 may be used for actuation control. In at least one embodiment, each bus 1702 may communicate with any of components of vehicle 1700, and two or more busses 1702 may communicate with same components. In at least one embodiment, each of any number of system(s) on chip(s) ("SoC(s)") 1704, each of controller(s) 1736, and/or each computer within vehicle may have access to same input data (e.g., inputs from sensors of vehicle 1700), and may be connected to a common bus, such CAN bus.

In at least one embodiment, vehicle 1700 may include one or more controller(s) 1736, such as those described herein with respect to FIG. 17A. Controller(s) 1736 may be used for a variety of functions. In at least one embodiment, controller(s) 1736 may be coupled to any of various other components and systems of vehicle 1700, and may be used for control of vehicle 1700, artificial intelligence of vehicle 1700, infotainment for vehicle 1700, and/or like.

In at least one embodiment, vehicle 1700 may include any number of SoCs 1704. Each of SoCs 1704 may include, without limitation, central processing units ("CPU(s)") 1706, graphics processing units ("GPU(s)") 1708, processor(s) 1710, cache(s) 1712, accelerator(s) 1714, data store(s) 1716, and/or other components and features not illustrated. In at least one embodiment, SoC(s) 1704 may be used to control vehicle 1700 in a variety of platforms and systems. For example, in at least one embodiment, SoC(s) 1704 may be combined in a system (e.g., system of vehicle 1700) with a High Definition ("HD") map 1722 which may obtain map refreshes and/or updates via network interface 1724 from one or more servers (not shown in FIG. 17B).

In at least one embodiment, CPU(s) 1706 may include a CPU cluster or CPU complex (alternatively referred to herein as a "CCPLEX"). In at least one embodiment, CPU(s) 1706 may include multiple cores and/or level two ("L2") caches. For instance, in at least one embodiment, CPU(s) 1706 may include eight cores in a coherent multi-processor configuration. In at least one embodiment, CPU(s) 1706 may include four dual-core clusters where each cluster has a dedicated L2 cache (e.g., a 2 MB L2 cache). In at least one embodiment, CPU(s) 1706 (e.g., CCPLEX) may be configured to support simultaneous cluster operation enabling any combination of clusters of CPU(s) 1706 to be active at any given time.

In at least one embodiment, one or more of CPU(s) 1706 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1706 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1708 may include an integrated GPU (alternatively referred to herein as an "iGPU"). In at least one embodiment, GPU(s) 1708 may be programmable and may be efficient for parallel workloads. In at least one embodiment, GPU(s) 1708, in at least one embodiment, may use an enhanced tensor instruction set. In at least one embodiment, GPU(s) 1708 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1708 may include at least eight streaming microprocessors. In at least one embodiment, GPU(s) 1708 may use compute application programming interface(s) (API(s)). In at least one embodiment, GPU(s) 1708 may use one or more parallel computing platforms and/or programming models (e.g., NVIDIA's CUDA).

In at least one embodiment, one or more of GPU(s) 1708 may be power-optimized for best performance in automotive and embedded use cases. For example, in on embodiment, GPU(s) 1708 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1708 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1708 may include unified memory technology. In at least one embodiment, address translation services ("ATS") support may be used to allow GPU(s) 1708 to access CPU(s) 1706 page tables directly. In at least one embodiment, embodiment, when GPU(s) 1708 memory management unit ("MMU") experiences a miss, an address translation request may be transmitted to CPU(s) 1706. In response, CPU(s) 1706 may look in its page tables for virtual-to-physical mapping for address and transmits translation back to GPU(s) 1708, in at least one embodiment. In at least one embodiment, unified memory technology may allow a single unified virtual address space for memory of both CPU(s) 1706 and GPU(s) 1708, thereby simplifying GPU(s) 1708 programming and porting of applications to GPU(s) 1708.

In at least one embodiment, GPU(s) 1708 may include any number of access counters that may keep track of frequency of access of GPU(s) 1708 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1704 may include any number of cache(s) 1712, including those described herein. For example, in at least one embodiment, cache(s) 1712 could include a level three ("L3") cache that is available to both CPU(s) 1706 and GPU(s) 1708 (e.g., that is connected both CPU(s) 1706 and GPU(s) 1708). In at least one embodiment, cache(s) 1712 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1704 may include one or more accelerator(s) 1714 (e.g., hardware accelerators, software accelerators, or a combination thereof). In at least one embodiment, SoC(s) 1704 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1708 and to off-load some of tasks of GPU(s) 1708 (e.g., to free up more cycles of GPU(s) 1708 for performing other tasks). In at least one embodiment, accelerator(s) 1714 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1714 (e.g., hardware acceleration cluster) may include a deep learning accelerator(s) ("DLA(s)"). DLA(s) may include, without limitation, one or more Tensor processing units ("TPU(s)") that may be configured to provide an additional ten trillion operations per second for deep learning applications and inferencing. In at least one embodiment, TPU(s) may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1796; a CNN for facial recognition and vehicle owner identification using data from camera sensors; and/or a CNN for security and/or safety related events.

In at least one embodiment, DLA(s) may perform any function of GPU(s) 1708, and by using an inference accelerator, for example, a designer may target either DLA(s) or GPU(s) 1708 for any function. For example, in at least one embodiment, designer may focus processing of CNNs and floating point operations on DLA(s) and leave other functions to GPU(s) 1708 and/or other accelerator(s) 1714.

In at least one embodiment, accelerator(s) 1714 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1738, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1706. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1714 (e.g., hardware acceleration cluster) may include a computer vision network on-chip and static random-access memory ("SRAM"), for providing a high-bandwidth, low latency SRAM for accelerator(s) 1714. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1704 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1714 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1700, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1766 that correlates with vehicle 1700 orientation, distance, 3D location estimates of object obtained from neural network and/or other sensors (e.g., LIDAR sensor(s) 1764 or RADAR sensor(s) 1760), among others.

In at least one embodiment, one or more of SoC(s) 1704 may include data store(s) 1716 (e.g., memory). In at least one embodiment, data store(s) 1716 may be on-chip memory of SoC(s) 1704, which may store neural networks to be executed on GPU(s) 1708 and/or DLA. In at least one embodiment, data store(s) 1716 may be large enough in capacity to store multiple instances of neural networks for redundancy and safety. In at least one embodiment, data store(s) 1716 may comprise L2 or L3 cache(s).

In at least one embodiment, one or more of SoC(s) 1704 may include any number of processor(s) 1710 (e.g., embedded processors). In at least one embodiment, processor(s) 1710 may include a boot and power management processor that may be a dedicated processor and subsystem to handle boot power and management functions and related security enforcement. In at least one embodiment, boot and power management processor may be a part of SoC(s) 1704 boot sequence and may provide runtime power management services. In at least one embodiment, boot power and management processor may provide clock and voltage programming, assistance in system low power state transitions, management of SoC(s) 1704 thermals and temperature sensors, and/or management of SoC(s) 1704 power states. In at least one embodiment, each temperature sensor may be implemented as a ring-oscillator whose output frequency is proportional to temperature, and SoC(s) 1704 may use ring-oscillators to detect temperatures of CPU(s) 1706, GPU(s) 1708, and/or accelerator(s) 1714. In at least one embodiment, if temperatures are determined to exceed a threshold, then boot and power management processor may enter a temperature fault routine and put SoC(s) 1704 into a lower power state and/or put vehicle 1700 into a chauffeur to safe stop mode (e.g., bring vehicle 1700 to a safe stop).

In at least one embodiment, processor(s) 1710 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1710 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1710 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1710 may further include a real-time camera engine that may include, without limitation, a dedicated processor subsystem for handling real-time camera management. In at least one embodiment, processor(s) 1710 may further include a high-dynamic range signal processor that may include, without limitation, an image signal processor that is a hardware engine that is part of camera processing pipeline.

In at least one embodiment, processor(s) 1710 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1770, surround camera(s) 1774, and/or on in-cabin monitoring camera sensor(s). In at least one embodiment, in-cabin monitoring camera sensor(s) are preferably monitored by a neural network running on another instance of SoC(s) 1704, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1708 are not required to continuously render new surfaces. In at least one embodiment, when GPU(s) 1708 are powered on and active doing 3D rendering, video image compositor may be used to offload GPU(s) 1708 to improve performance and responsiveness.

In at least one embodiment, one or more of SoC(s) 1704 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1704 may further include an input/output controller(s) that may be controlled by software and may be used for receiving I/O signals that are uncommitted to a specific role.

In at least one embodiment, one or more of SoC(s) 1704 may further include a broad range of peripheral interfaces to enable communication with peripherals, audio encoders/decoders ("codecs"), power management, and/or other devices. SoC(s) 1704 may be used to process data from cameras (e.g., connected over Gigabit Multimedia Serial Link and Ethernet), sensors (e.g., LIDAR sensor(s) 1764, RADAR sensor(s) 1760, etc. that may be connected over Ethernet), data from bus 1702 (e.g., speed of vehicle 1700, steering wheel position, etc.), data from GNSS sensor(s) 1758 (e.g., connected over Ethernet or CAN bus), etc. In at least one embodiment, one or more of SoC(s) 1704 may further include dedicated high-performance mass storage controllers that may include their own DMA engines, and that may be used to free CPU(s) 1706 from routine data management tasks.

In at least one embodiment, SoC(s) 1704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1704 may be faster, more reliable, and even more energy-efficient and space-efficient than conventional systems. For example, in at least one embodiment, accelerator(s) 1714, when combined with CPU(s) 1706, GPU(s) 1708, and data store(s) 1716, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1720) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, a sign itself may be identified as a traffic sign by a first deployed neural network (e.g., a neural network that has been trained) and a text "flashing lights indicate icy conditions" may be interpreted by a second deployed neural network, which informs vehicle's path planning software (preferably executing on CPU Complex) that when flashing lights are detected, icy conditions exist. In at least one embodiment, a flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1708.

In at least one embodiment, a CNN for facial recognition and vehicle owner identification may use data from camera sensors to identify presence of an authorized driver and/or owner of vehicle 1700. In at least one embodiment, an always on sensor processing engine may be used to unlock vehicle when owner approaches driver door and turn on lights, and, in security mode, to disable vehicle when owner leaves vehicle. In this way, SoC(s) 1704 provide for security against theft and/or carjacking.

In at least one embodiment, a CNN for emergency vehicle detection and identification may use data from microphones 1796 to detect and identify emergency vehicle sirens. In at least one embodiment, SoC(s) 1704 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1758. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1762, until emergency vehicle(s) passes.

In at least one embodiment, vehicle 1700 may include CPU(s) 1718 (e.g., discrete CPU(s), or dCPU(s)), that may be coupled to SoC(s) 1704 via a high-speed interconnect (e.g., PCIe). In at least one embodiment, CPU(s) 1718 may include an X86 processor, for example. CPU(s) 1718 may be used to perform any of a variety of functions, including arbitrating potentially inconsistent results between ADAS sensors and SoC(s) 1704, and/or monitoring status and health of controller(s) 1736 and/or an infotainment system on a chip ("infotainment SoC") 1730, for example.

In at least one embodiment, vehicle 1700 may include GPU(s) 1720 (e.g., discrete GPU(s), or dGPU(s)), that may be coupled to SoC(s) 1704 via a high-speed interconnect (e.g., NVIDIA's NVLINK). In at least one embodiment, GPU(s) 1720 may provide additional artificial intelligence functionality, such as by executing redundant and/or different neural networks, and may be used to train and/or update neural networks based at least in part on input (e.g., sensor data) from sensors of vehicle 1700.

In at least one embodiment, vehicle 1700 may further include network interface 1724 which may include, without limitation, wireless antenna(s) 1726 (e.g., one or more wireless antennas 1726 for different communication protocols, such as a cellular antenna, a Bluetooth antenna, etc.). In at least one embodiment, network interface 1724 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 170 and other vehicle and/or an indirect link may be established (e.g., across networks and over Internet). In at least one embodiment, direct links may be provided using a vehicle-to-vehicle communication link. A vehicle-to-vehicle communication link may provide vehicle 1700 information about vehicles in proximity to vehicle 1700 (e.g., vehicles in front of, on side of, and/or behind vehicle 1700). In at least one embodiment, aforementioned functionality may be part of a cooperative adaptive cruise control functionality of vehicle 1700.

In at least one embodiment, network interface 1724 may include an SoC that provides modulation and demodulation functionality and enables controller(s) 1736 to communicate over wireless networks. In at least one embodiment, network interface 1724 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1700 may further include data store(s) 1728 which may include, without limitation, off-chip (e.g., off SoC(s) 1704) storage. In at least one embodiment, data store(s) 1728 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1700 may further include GNSS sensor(s) 1758 (e.g., GPS and/or assisted GPS sensors), to assist in mapping, perception, occupancy grid generation, and/or path planning functions. In at least one embodiment, any number of GNSS sensor(s) 1758 may be used, including, for example and without limitation, a GPS using a USB connector with an Ethernet to Serial (e.g., RS-232) bridge.

In at least one embodiment, vehicle 1700 may further include RADAR sensor(s) 1760. RADAR sensor(s) 1760 may be used by vehicle 1700 for long-range vehicle detection, even in darkness and/or severe weather conditions. In at least one embodiment, RADAR functional safety levels may be ASIL B. RADAR sensor(s) 1760 may use CAN and/or bus 1702 (e.g., to transmit data generated by RADAR sensor(s) 1760) for control and to access object tracking data, with access to Ethernet to access raw data in some examples. In at least one embodiment, wide variety of RADAR sensor types may be used. For example, and without limitation, RADAR sensor(s) 1760 may be suitable for front, rear, and side RADAR use. In at least one embodiment, one or more of RADAR sensors(s) 1760 are Pulse Doppler RADAR sensor(s).

In at least one embodiment, RADAR sensor(s) 1760 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1760 may help in distinguishing between static and moving objects, and may be used by ADAS system 1738 for emergency brake assist and forward collision warning. Sensors 1760(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle 1700's surroundings at higher speeds with minimal interference from traffic in adjacent lanes. In at least one embodiment, other two antennae may expand field of view, making it possible to quickly detect vehicles entering or leaving vehicle 1700's lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1760 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1738 for blind spot detection and/or lane change assist.

In at least one embodiment, vehicle 1700 may further include ultrasonic sensor(s) 1762. Ultrasonic sensor(s) 1762, which may be positioned at front, back, and/or sides of vehicle 1700, may be used for park assist and/or to create and update an occupancy grid. In at least one embodiment, a wide variety of ultrasonic sensor(s) 1762 may be used, and different ultrasonic sensor(s) 1762 may be used for different ranges of detection (e.g., 2.5 m, 4 m). In at least one embodiment, ultrasonic sensor(s) 1762 may operate at functional safety levels of ASIL B.

In at least one embodiment, vehicle 1700 may include LIDAR sensor(s) 1764. LIDAR sensor(s) 1764 may be used for object and pedestrian detection, emergency braking, collision avoidance, and/or other functions. In at least one embodiment, LIDAR sensor(s) 1764 may be functional safety level ASIL B. In at least one embodiment, vehicle 1700 may include multiple LIDAR sensors 1764 (e.g., two, four, six, etc.) that may use Ethernet (e.g., to provide data to a Gigabit Ethernet switch).

In at least one embodiment, LIDAR sensor(s) 1764 may be capable of providing a list of objects and their distances for a 360-degree field of view. In at least one embodiment, commercially available LIDAR sensor(s) 1764 may have an advertised range of approximately 100 m, with an accuracy of 2 cm-3 cm, and with support for a 100 Mbps Ethernet connection, for example. In at least one embodiment, one or more non-protruding LIDAR sensors 1764 may be used. In such an embodiment, LIDAR sensor(s) 1764 may be implemented as a small device that may be embedded into front, rear, sides, and/or corners of vehicle 1700. In at least one embodiment, LIDAR sensor(s) 1764, in such an embodiment, may provide up to a 120-degree horizontal and 35-degree vertical field-of-view, with a 200 m range even for low-reflectivity objects. In at least one embodiment, front-mounted LIDAR sensor(s) 1764 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1700 up to approximately 200 m. In at least one embodiment, a flash LIDAR unit includes, without limitation, a receptor, which records laser pulse transit time and reflected light on each pixel, which in turn corresponds to range from vehicle 1700 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1700. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device(s) may use a 5 nanosecond class I (eye-safe) laser pulse per frame and may capture reflected laser light in form of 3D range point clouds and co-registered intensity data.

In at least one embodiment, vehicle may further include IMU sensor(s) 1766. In at least one embodiment, IMU sensor(s) 1766 may be located at a center of rear axle of vehicle 1700, in at least one embodiment. In at least one embodiment, IMU sensor(s) 1766 may include, for example and without limitation, accelerometer(s), magnetometer(s), gyroscope(s), magnetic compass(es), and/or other sensor types. In at least one embodiment, such as in six-axis applications, IMU sensor(s) 1766 may include, without limitation, accelerometers and gyroscopes. In at least one embodiment, such as in nine-axis applications, IMU sensor(s) 1766 may include, without limitation, accelerometers, gyroscopes, and magnetometers.

In at least one embodiment, IMU sensor(s) 1766 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1766 may enable vehicle 1700 to estimate heading without requiring input from a magnetic sensor by directly observing and correlating changes in velocity from GPS to IMU sensor(s) 1766. In at least one embodiment, IMU sensor(s) 1766 and GNSS sensor(s) 1758 may be combined in a single integrated unit.

In at least one embodiment, vehicle 1700 may include microphone(s) 1796 placed in and/or around vehicle 1700. In at least one embodiment, microphone(s) 1796 may be used for emergency vehicle detection and identification, among other things.

In at least one embodiment, vehicle 1700 may further include any number of camera types, including stereo camera(s) 1768, wide-view camera(s) 1770, infrared camera(s) 1772, surround camera(s) 1774, long-range camera(s) 1798, mid-range camera(s) 1776, and/or other camera types. In at least one embodiment, cameras may be used to capture image data around an entire periphery of vehicle 1700. In at least one embodiment, types of cameras used depends on vehicle 1700. In at least one embodiment, any combination of camera types may be used to provide necessary coverage around vehicle 1700. In at least one embodiment, number of cameras may differ depending on embodiment. For example, in at least one embodiment, vehicle 1700 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 17A and FIG. 1.

In at least one embodiment, vehicle 1700 may further include vibration sensor(s) 1742. In at least one embodiment, vibration sensor(s) 1742 may measure vibrations of components of vehicle 1700, such as axle(s). For example, in at least one embodiment, changes in vibrations may indicate a change in road surfaces. In at least one embodiment, when two or more vibration sensors 1742 are used, differences between vibrations may be used to determine friction or slippage of road surface (e.g., when difference in vibration is between a power-driven axle and a freely rotating axle).

In at least one embodiment, vehicle 1700 may include ADAS system 1738. ADAS system 1738 may include, without limitation, an SoC, in some examples. In at least one embodiment, ADAS system 1738 may include, without limitation, any number and combination of an autonomous/ adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1760, LIDAR sensor(s) 1764, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1700 and automatically adjust speed of vehicle 1700 to maintain a safe distance from vehicles ahead. In at least one embodiment, lateral ACC system performs distance keeping, and advises vehicle 1700 to change lanes when necessary. In at least one embodiment, lateral ACC is related to other ADAS applications such as LC and CW.

In at least one embodiment, CACC system uses information from other vehicles that may be received via network interface 1724 and/or wireless antenna(s) 1726 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1700), while I2V communication concept provides information about traffic further ahead. In at least one embodiment, CACC system may include either or both I2V and V2V information sources. In at least one embodiment, given information of vehicles ahead of vehicle 1700, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1760, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1760, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1700 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1700 if vehicle 1700 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1760, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1700 is backing up. In at least one embodiment, RCTW system includes AEB system to ensure that vehicle brakes are applied to avoid a crash. In at least one embodiment, RCTW system may use one or more rear-facing RADAR sensor(s) 1760, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1700 itself decides, in case of conflicting results, whether to heed result from a primary computer or a secondary computer (e.g., first controller 1736 or second controller 1736). For example, in at least one embodiment, ADAS system 1738 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1738 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1704.

In at least one embodiment, ADAS system 1738 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional nonidentity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1738 may be fed into primary computer's perception block and/or primary computer's dynamic driving task block. For example, in at least one embodiment, if ADAS system 1738 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1700 may further include infotainment SoC 1730 (e.g., an in-vehicle infotainment system (IVI)). Although illustrated and described as an SoC, infotainment system 1730, in at least one embodiment, may not be an SoC, and may include, without limitation, two or more discrete components. In at least one embodiment, infotainment SoC 1730 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1700. For example, infotainment SoC 1730 could include radios, disk players, navigation systems, video players, USB and Bluetooth connectivity, carputers, in-car entertainment, WiFi, steering wheel audio controls, hands free voice control, a heads-up display ("HUD"), HMI display 1734, a telematics device, a control panel (e.g., for controlling and/or interacting with various components, features, and/or systems), and/or other components. In at least one embodiment, infotainment SoC 1730 may further be used to provide information (e.g., visual and/or audible) to user(s) of vehicle, such as information from ADAS system 1738, autonomous driving information such as planned vehicle maneuvers, trajectories, surrounding environment information (e.g., intersection information, vehicle information, road information, etc.), and/or other information.

In at least one embodiment, infotainment SoC 1730 may include any amount and type of GPU functionality. In at least one embodiment, infotainment SoC 1730 may communicate over bus 1702 (e.g., CAN bus, Ethernet, etc.) with other devices, systems, and/or components of vehicle 1700. In at least one embodiment, infotainment SoC 1730 may be coupled to a supervisory MCU such that GPU of infotainment system may perform some self-driving functions in event that primary controller(s) 1736 (e.g., primary and/or backup computers of vehicle 1700) fail. In at least one embodiment, infotainment SoC 1730 may put vehicle 1700 into a chauffeur to safe stop mode, as described herein.

In at least one embodiment, vehicle 1700 may further include instrument cluster 1732 (e.g., a digital dash, an electronic instrument cluster, a digital instrument panel, etc.). In at least one embodiment, instrument cluster 1732 may include, without limitation, a controller and/or supercomputer (e.g., a discrete controller or supercomputer). In at least one embodiment, instrument cluster 1732 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1730 and instrument cluster 1732. In at least one embodiment, instrument cluster 1732 may be included as part of infotainment SoC 1730, or vice versa.

Inference and/or training logic 1115 are used to perform inferencing and/or training operations associated with one or more embodiments. Details regarding inference and/or one embodiment, inference and/or training logic 1115 may be used in system FIG. 17B for inferencing or predicting operations based, at least in part, on weight parameters calculated using neural network training operations, neural network functions and/or architectures, or neural network use cases described herein.

Such components can be used to perform classification or segmentation of one or more objects represented in image data in at least one embodiment. This can include using a shape stream in parallel with a primary image analysis stream in order to force the primary stream to consider shape information for the object(s).

Figure 17C:
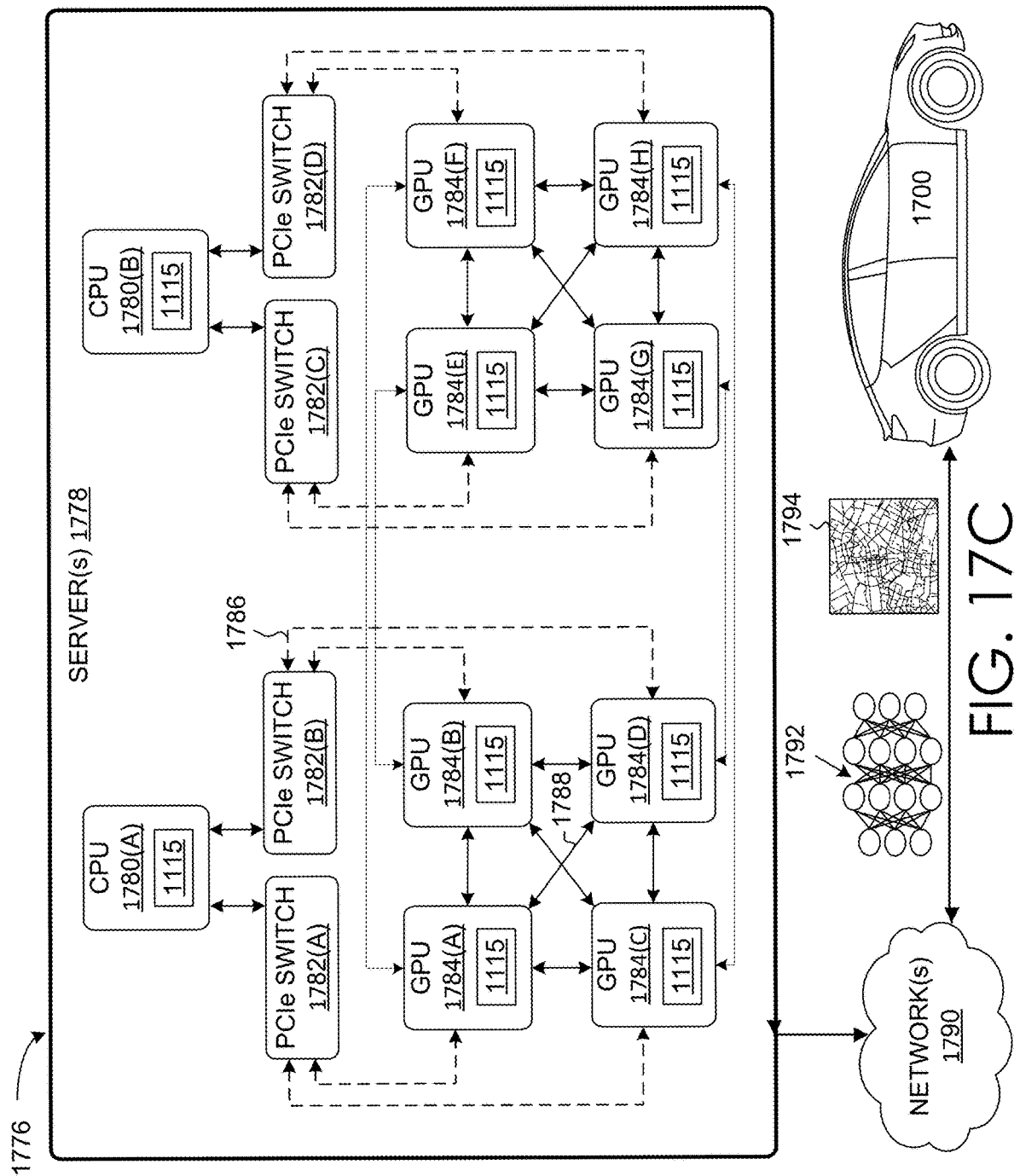
FIG. 17C illustrates a system for communication between cloud-based server(s) and the autonomous vehicle of FIG. 17A, according to at least one embodiment.

FIG. 17C is a diagram of a system 1776 for communication between cloud-based server(s) and autonomous vehicle 1700 of FIG. 17A, according to at least one embodiment. In at least one embodiment, system 1776 may include, without limitation, server(s) 1778, network(s) 1790, and any number and type of vehicles, including vehicle 1700. In at least one embodiment, server(s) 1778 may include, without limitation, a plurality of GPUs 1784(A)-1784(H) (collectively referred to herein as GPUs 1784), PCIe switches 1782(A)-1782(D) (collectively referred to herein as PCIe switches 1782), and/or CPUs 1780(A)-1780(B) (collectively referred to herein as CPUs 1780). GPUs 1784, CPUs 1780, and PCIe switches 1782 may be interconnected with high-speed interconnects such as, for example and without limitation, NVLink interfaces 1788 developed by NVIDIA and/or PCIe connections 1786. In at least one embodiment, GPUs 1784 are connected via an NVLink and/or NVSwitch SoC and GPUs 1784 and PCIe switches 1782 are connected via PCIe interconnects. In at least one embodiment, although eight GPUs 1784, two CPUs 1780, and four PCIe switches 1782 are illustrated, this is not intended to be limiting. In at least one embodiment, each of server(s) 1778 may include, without limitation, any number of GPUs 1784, CPUs 1780, and/or PCIe switches 1782, in any combination. For example, in at least one embodiment, server(s) 1778 could each include eight, sixteen, thirty-two, and/or more GPUs 1784.

In at least one embodiment, server(s) 1778 may receive, over network(s) 1790 and from vehicles, image data representative of images showing unexpected or changed road conditions, such as recently commenced road-work. In at least one embodiment, server(s) 1778 may transmit, over network(s) 1790 and to vehicles, neural networks 1792, updated neural networks 1792, and/or map information 1794, including, without limitation, information regarding traffic and road conditions. In at least one embodiment, updates to map information 1794 may include, without limitation, updates for HD map 1722, such as information regarding construction sites, potholes, detours, flooding, and/or other obstructions. In at least one embodiment, neural networks 1792, updated neural networks 1792, and/or map information 1794 may have resulted from new training and/or experiences represented in data received from any number of vehicles in environment, and/or based at least in part on training performed at a data center (e.g., using server(s) 1778 and/or other servers).

In at least one embodiment, server(s) 1778 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1790, and/or machine learning models may be used by server(s) 1778 to remotely monitor vehicles.

In at least one embodiment, server(s) 1778 may receive data from vehicles and apply data to up-to-date real-time neural networks for real-time intelligent inferencing. In at least one embodiment, server(s) 1778 may include deep-learning supercomputers and/or dedicated AI computers powered by GPU(s) 1784, such as a DGX and DGX Station machines developed by NVIDIA. However, in at least one embodiment, server(s) 1778 may include deep learning infrastructure that use CPU-powered data centers.

In at least one embodiment, deep-learning infrastructure of server(s) 1778 may be capable of fast, real-time inferencing, and may use that capability to evaluate and verify health of processors, software, and/or associated hardware in vehicle 1700. For example, in at least one embodiment, deep-learning infrastructure may receive periodic updates from vehicle 1700, such as a sequence of images and/or objects that vehicle 1700 has located in that sequence of images (e.g., via computer vision and/or other machine learning object classification techniques). In at least one embodiment, deep-learning infrastructure may run its own neural network to identify objects and compare them with objects identified by vehicle 1700 and, if results do not match and deep-learning infrastructure concludes that AI in vehicle 1700 is malfunctioning, then server(s) 1778 may transmit a signal to vehicle 1700 instructing a fail-safe computer of vehicle 1700 to assume control, notify passengers, and complete a safe parking maneuver.

In at least one embodiment, server(s) 1778 may include GPU(s) 1784 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, inference and/or training logic 1115 are used to perform one or more embodiments. Details regarding inference and/or training logic 1115 are provided below in conjunction with FIGS. 11A and/or 11B.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
    inferring boundary data for one or more objects represented in an image,
    inferring, at least partially in parallel with inferring the boundary data, semantic data for the image; and
    fusing the boundary data with the semantic data to infer a segmentation and an object type corresponding to at least one object of the one or more objects.

2. The computer-implemented method of claim 1, further comprising:
    inferring the boundary data in parallel with a primary stream inferring the semantic data using a multi-stream convolutional neural network (CNN).

3. The computer-implemented method of claim 2, further comprising:
    fusing the boundary data with the semantic data at one or more layers of the CNN.

4. The computer-implemented method of claim 2, wherein intermediate layers of the CNN are connected using a plurality of gated convolutional layers.

5. The computer-implemented method of claim 2, further comprising:
    inferring boundary data from successive convolutional layers of a shape stream by identifying and removing portions of the image that do not correspond to the boundary data.

6. The computer-implemented method of claim 1, further comprising:
    fusing the boundary data with the semantic data using layers of a fusion network.

7. The computer-implemented method of claim 1, further comprising:
    inferring the segmentation for performing at least one voice activated input command based on a confidence value associated with a neural network and the at least one object of the one or more objects.

8. The computer-implemented method of claim 1, further comprising:
    inferring the segmentation using deep learning accelerators ("DLA") for an advanced driver assistance system ("ADAS"), an autonomous driving system, augmented reality ("AR") applications, and virtual reality ("VR") applications.

9. The computer-implemented method of claim 1, further comprising:
    inferring the semantic data for the image based on a trained deep neural network using a subset of training data from a simulation.

10. The computer-implemented method of claim 1, further comprising:
    determining at least one action, based on the boundary data, the action associated with at least one of an autonomous vehicle, a robotic arm, and a security alarm.

11. A processor, comprising:
    one or more circuits to:
        receive image data captured of an environment;
        infer boundary data for one or more objects represented in the image data,
        infer, at least partially in parallel with inferring the boundary data, semantic data for the image data; and
        fuse the boundary data with semantic data to infer a segmentation and an object type corresponding to at least one object of the one or more objects.

12. The processor of claim 11, wherein the one or more circuits are further to:
    infer the boundary data in parallel with a primary stream inferring the semantic data using a multi-stream convolutional neural network (CNN).

13. The processor of claim 11, wherein the one or more circuits are further to:
    infer the segmentation for performing at least one voice activated input command based on a confidence value associated with a neural network and the at least one object of the one or more objects.

14. The processor of claim 11, wherein the one or more circuits are further to:
    infer the segmentation using deep learning accelerators ("DLA") for an advanced driver assistance system ("ADAS"), an autonomous driving system, augmented reality ("AR") applications, and virtual reality ("VR") applications.

15. The processor of claim 11, wherein the one or more circuits are further to:
    infer the semantic data for the image based on a trained deep neural network using a subset of training data from a simulation.

16. The processor of claim 11, wherein the one or more circuits are further to:
    determine at least one action, based on the boundary data, the action associated with at least one of an autonomous vehicle, a robotic arm, and a security alarm.

17. A control system for an automated device, comprising:
    a camera;
    a control mechanism;
    at least one processor; and
    memory including instructions that, when executed by the at least one processor, cause the control system to:
        capture by the camera, at least one image of an environment associated with the automated device;
        infer boundary data of one or more objects represented in the at least one image,
        infer, at least partially in parallel with inferring the boundary data, semantic data for the at least one image; and
        fuse the boundary data with the semantic data to infer a segmentation and an object type corresponding to at least one object of the one or more objects.

18. The control system of claim 17, wherein the instructions when executed further cause the system to:

infer the boundary data in parallel with a primary stream which infers the semantic data using a convolutional neural network (CNN).

19. The control system of claim 17, wherein the instructions when executed further cause the system to:

infer the segmentation for performing at least one voice activated input command based on a confidence value associated with a neural network and the at least one object of the one or more objects.

20. The control system of claim 17, wherein the instructions when executed further cause the system to:

adjust, based on the inferred segmentation, a path of navigation associated with a current location and a current direction of the automated device.

\* \* \* \* \*